(12) United States Patent
Hanley et al.

(10) Patent No.: US 9,796,339 B2
(45) Date of Patent: Oct. 24, 2017

(54) SHELVING SYSTEM WITH A LADDER CAGE

(71) Applicant: DeJana Truck & Utility, Kings Park, NY (US)

(72) Inventors: Charles L. Hanley, Woonsocket, RI (US); Kevin J. Trainor, Sr., Danbury, CT (US)

(73) Assignee: Dejana Truck & Utility Equipment Company, LLC, Kings Park, NY (US)

( * ) Notice: Subject to any disclaimer, the term of this patent is extended or adjusted under 35 U.S.C. 154(b) by 0 days.

(21) Appl. No.: 14/882,010

(22) Filed: Oct. 13, 2015

(65) Prior Publication Data

US 2016/0375837 A1 Dec. 29, 2016

Related U.S. Application Data

(63) Continuation of application No. 14/752,104, filed on Jun. 26, 2015, now Pat. No. 9,233,647.

(51) Int. Cl.
| | |
|---|---|
| *A47F 5/00* | (2006.01) |
| *B60N 3/00* | (2006.01) |
| *B60R 9/042* | (2006.01) |
| *B25H 5/00* | (2006.01) |
| *B25H 3/04* | (2006.01) |
| *E06C 5/24* | (2006.01) |
| *B60R 7/08* | (2006.01) |
| *B60P 3/14* | (2006.01) |
| *B60R 11/06* | (2006.01) |

(Continued)

(52) U.S. Cl.
CPC ............ *B60R 9/0423* (2013.01); *A47B 81/00* (2013.01); *B25H 3/00* (2013.01); *B25H 3/04* (2013.01); *B25H 5/00* (2013.01); *B60P 3/14* (2013.01); *B60R 7/08* (2013.01); *B60R 9/0485* (2013.01); *B60R 11/06* (2013.01); *E06C 5/24* (2013.01)

(58) Field of Classification Search
CPC ....... B60R 9/0485; B60R 7/08; B60R 9/0432; B60R 9/04; B60R 9/042; B60R 9/048; B60R 9/0423; B60R 11/06; E06C 5/24; A47B 81/00; A47F 7/28; B25H 3/04; B25H 3/00; B25H 5/00; B60P 3/14
USPC .......... 211/134, 162, 151; 248/77, 210, 211, 248/238; 224/310, 324, 42, 43
See application file for complete search history.

(56) References Cited

U.S. PATENT DOCUMENTS 1,778,277 A 10/1930 Saville
1,820,289 A * 8/1931 Rawson ................. E21B 15/00
182/106

(Continued)

FOREIGN PATENT DOCUMENTS

| CA | 2450511 A1 * | 4/2005 | .......... B60R 9/0423 |
| IT | EP 1127745 A1 * | 8/2001 | .......... B60R 9/0423 |
| WO | WO 2009039334 A1 * | 3/2009 | ............... B60P 3/40 |

*Primary Examiner* — Jennifer E Novosad
(74) *Attorney, Agent, or Firm* — Sorell Lenna & Schmidt, LLP

(57) ABSTRACT

A ladder cage is provided. The ladder cage includes opposite first and second sidewalls each extending parallel to a longitudinal axis. Spaced apart brackets are coupled to one of the sidewalls. Spaced apart rollers extend between the sidewalls. The rollers are each rotatable relative to the sidewalls along a rotation axis that extends transverse to the longitudinal axis. The rollers and inner surfaces of the brackets and the sidewalls define a housing configured for disposal of a ladder.

19 Claims, 18 Drawing Sheets

(51) Int. Cl.
  *B25H 3/00* (2006.01)
  *A47B 81/00* (2006.01)
  *B60R 9/048* (2006.01)

(56) References Cited

U.S. PATENT DOCUMENTS

| | | | |
|---|---|---|---|
| 2,158,503 A | 5/1939 | Hewel | |
| 2,889,950 A * | 6/1959 | Grimshaw | B60P 3/1025 224/310 |
| 3,527,371 A * | 9/1970 | Warren, Jr. | B60P 3/062 224/310 |
| 3,843,001 A * | 10/1974 | Willis | B60P 3/122 224/402 |
| 3,870,124 A * | 3/1975 | Howard | E04G 5/10 182/120 |
| 3,888,398 A * | 6/1975 | Payne | B60R 9/0423 224/310 |
| 3,912,139 A * | 10/1975 | Bowman | B60R 9/00 211/22 |
| 4,015,718 A * | 4/1977 | Bernard | B62H 3/08 211/20 |
| 4,126,228 A * | 11/1978 | Bala | B62H 3/08 211/22 |
| 4,189,274 A * | 2/1980 | Shaffer | B60R 9/10 224/509 |
| 4,234,285 A * | 11/1980 | Martinez | B60R 9/042 224/310 |
| 4,473,178 A * | 9/1984 | Bott | B60R 9/045 224/321 |
| 4,646,952 A * | 3/1987 | Timmers | B60R 9/06 224/485 |
| 4,664,225 A * | 5/1987 | Coutier | E06C 7/006 182/106 |
| 4,768,745 A * | 9/1988 | Sauber | B60R 9/0485 224/323 |
| 4,815,638 A * | 3/1989 | Hutyra | B60R 9/10 224/516 |
| 4,917,430 A | 4/1990 | Lawrence | |
| 4,954,030 A * | 9/1990 | Szucs | B60R 9/048 224/318 |
| 5,172,952 A | 12/1992 | Lasnetski | |
| 5,242,094 A * | 9/1993 | Finley | B60R 9/0485 182/127 |
| 5,360,151 A * | 11/1994 | Fine | B60R 9/042 224/309 |
| 5,423,650 A * | 6/1995 | Zerbst | B60R 9/042 224/310 |
| 5,462,398 A * | 10/1995 | Hymer | B60P 3/07 414/462 |
| 5,469,933 A * | 11/1995 | Thomason | E06C 5/02 182/127 |
| 5,498,048 A | 3/1996 | Shelby, Jr. | |
| 5,647,719 A * | 7/1997 | Bowlen | B60P 3/122 224/495 |
| 5,690,259 A * | 11/1997 | Montani | B60R 9/10 224/310 |
| 5,899,655 A * | 5/1999 | Miller | B60P 3/07 224/510 |
| 6,092,972 A * | 7/2000 | Levi | B60R 9/0423 224/310 |
| 6,099,232 A * | 8/2000 | Dixon | B60P 1/14 224/310 |
| 6,328,365 B1 | 12/2001 | Adsit | |
| 6,382,480 B1 * | 5/2002 | Egly | B60R 5/00 224/310 |
| 6,394,283 B1 * | 5/2002 | Fletcher | B62H 3/08 211/20 |
| 6,431,615 B1 | 8/2002 | Bastian | |
| 6,527,353 B1 | 3/2003 | Bradfish et al. | |
| 6,547,289 B1 | 4/2003 | Greenheck et al. | |
| 6,698,994 B2 * | 3/2004 | Barrett | B60P 3/122 414/462 |
| 6,712,247 B1 * | 3/2004 | Fox | B60R 9/042 224/310 |
| 6,854,627 B2 * | 2/2005 | Foo | B60R 9/048 182/127 |
| 6,929,094 B1 * | 8/2005 | Kohlmeier | E06C 7/185 182/106 |
| 6,997,527 B2 | 2/2006 | Cheng | |
| 7,048,347 B1 | 5/2006 | Liu | |
| 7,048,490 B2 * | 5/2006 | Henderson | B60R 9/042 224/310 |
| 7,581,917 B1 * | 9/2009 | Depagter | B60P 3/40 224/321 |
| 7,694,830 B1 * | 4/2010 | Larson | B62H 3/08 211/20 |
| 8,033,777 B2 * | 10/2011 | Janecek | B60P 1/00 414/546 |
| 8,038,195 B1 | 10/2011 | Hutcheson | |
| 8,157,312 B2 | 4/2012 | Bliss, Jr. et al. | |
| 8,272,547 B1 * | 9/2012 | Mital | B60R 9/10 224/501 |
| 8,408,638 B2 | 4/2013 | Pencak et al. | |
| 8,950,592 B1 * | 2/2015 | Greenblatt | B62H 3/08 211/17 |
| 8,991,889 B1 * | 3/2015 | Levi | B60P 1/486 224/310 |
| 9,010,830 B2 | 4/2015 | Hanley | |
| 9,096,182 B1 * | 8/2015 | Roth | B60R 9/10 |
| 9,233,647 B1 * | 1/2016 | Hanley | B25H 3/00 |
| 2002/0125279 A1 * | 9/2002 | Edgerly | B60R 9/048 224/310 |
| 2004/0173651 A1 * | 9/2004 | Kim | B60R 9/042 224/310 |
| 2005/0189172 A1 * | 9/2005 | Becker | E04G 5/10 182/106 |
| 2005/0236228 A1 * | 10/2005 | Thibault | E06C 5/24 182/127 |
| 2006/0133914 A1 * | 6/2006 | Derks | B60R 9/042 414/462 |
| 2007/0151801 A1 * | 7/2007 | Talley | E06C 7/185 182/106 |
| 2008/0012375 A1 | 1/2008 | Steiger et al. | |
| 2009/0140021 A1 * | 6/2009 | Richter | E06C 5/04 224/310 |
| 2009/0145940 A1 * | 6/2009 | Bukowiec | B60R 9/048 224/310 |
| 2010/0326936 A1 | 12/2010 | Hanley | |
| 2011/0214944 A1 * | 9/2011 | Levi | B60R 9/0485 182/127 |
| 2011/0260488 A1 | 10/2011 | Bliss, Jr. et al. | |
| 2013/0315693 A1 * | 11/2013 | Diverdi | B60R 9/0423 414/462 |
| 2014/0144006 A1 * | 5/2014 | Ashouri | E06C 7/185 29/525.08 |

\* cited by examiner

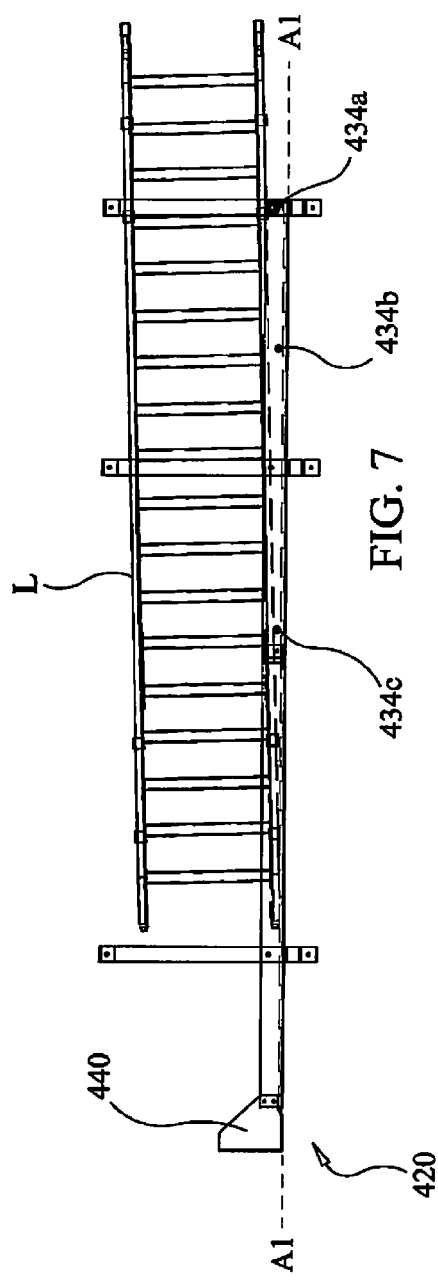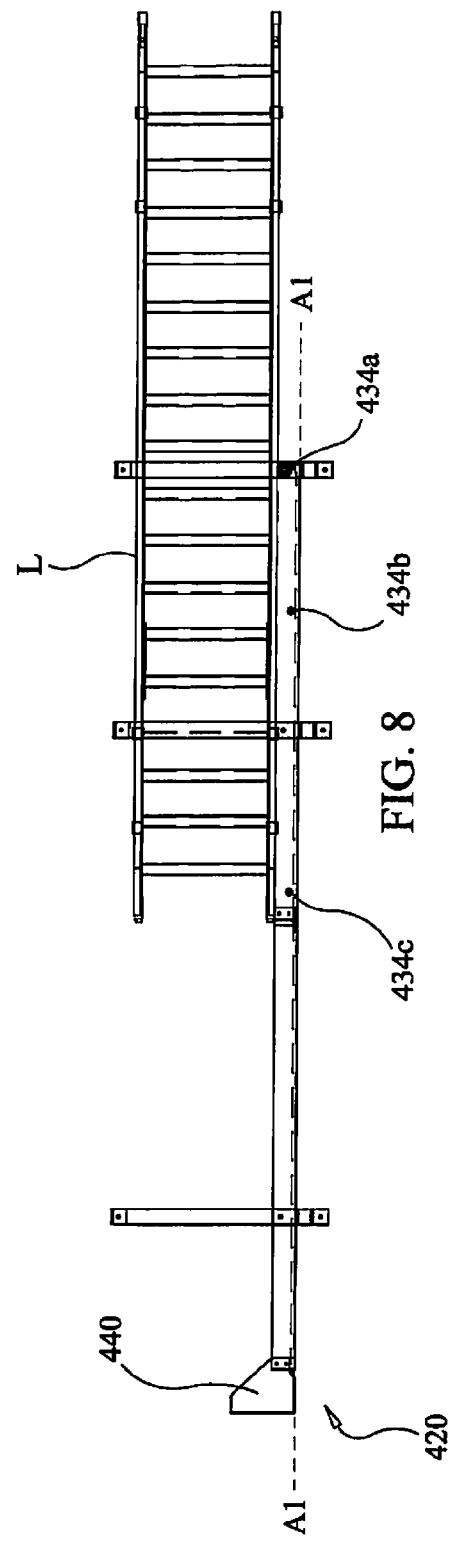

SHELVING SYSTEM WITH A LADDER CAGE

CROSS-REFERENCE TO RELATED APPLICATION

This application is a continuation of U.S. application Ser. No. 14/752,104, filed Jun. 26,2015, which is incorporated herein by reference, in its entirety.

TECHNICAL FIELD

The present disclosure generally relates to shelves used to store items, and more particularly to a shelving system for temporarily storing items, wherein the shelving system is adapted to fit in a vehicle to store items that are typically mounted to the exterior of the vehicle within the interior of the vehicle.

BACKGROUND

Service vehicles such as, for example, trucks, vans and cars may carry long and/or cumbersome items that may be used when providing services. Due to the dimensions of such items, conventional shelving systems positioned within the interior of the vehicle are unable to accommodate long and/or cumbersome items, while still leaving room to put other items on the shelves. As such, servicemen typically mount long and/or cumbersome items to an exterior of the vehicle. For example, many servicemen require a ladder to do their job each day, or at least from time to time. Many servicemen will mount the ladder to the exterior of the vehicle, such as, for example, to the roof of a van, when the ladder is not in use. This allows the serviceman to transport the ladder from one job to another, for example. Likewise, many servicemen will store materials used to do a certain job, such as, for example, rebar, pipes, cables, etc. within tubes that mounted to the exterior of the vehicle, such as, for example, to the roof of a van. This allows the serviceman to remove the material from the tube, as needed, after he or she arrives at a job site, for example.

However, when items and/or materials are mounted to the exterior of a vehicle, there is a risk that the items and/or materials will be stolen when the serviceman is away from his vehicle. Furthermore, there is a risk that the items and/or materials may become damaged by environmental conditions, such as, for example, exposure to the sun, temperature, precipitation and/or humidity. Still further, there is a risk that the items and/or materials may fall off the vehicle during transit. The fallen items and/or materials could be lost or damaged. The fallen items and/or materials may also cause damage or injury to people or property if the items and/or materials were to hit another vehicle or person, for example, thus creating liability for the serviceman and/or his company. This disclosure describes an improvement over these prior art technologies.

SUMMARY

In one embodiment, in accordance with the principles of the present disclosure, a ladder cage is provided. The ladder cage includes opposite first and second sidewalls each extending parallel to a longitudinal axis. Spaced apart brackets are coupled to one of the sidewalls. Spaced apart rollers extend between the sidewalls. The rollers are each rotatable relative to the sidewalls along a rotation axis that extends transverse to the longitudinal axis. The rollers and inner surfaces of the brackets and the sidewalls define a housing configured for disposal of a ladder.

In one embodiment, in accordance with the principles of the present disclosure, the shelving system indudes a ladder, first and second shelving units, a cage and a tubular carrier. The first shelving unit comprises first and second side members, a first cross member extending between and connecting the first side member with the second side member and a first container including a pair of spaced apart first side walls, one of the first side walls being movably coupled to the first cross member. The second shelving unit is spaced apart from the first shelving unit and comprises third and fourth side members and a vertical member that is aligned with the third and fourth side members along a transverse axis. A second cross member extends between and connects the third side member with the fourth side member. A second container includes a pair of spaced apart second side wall. One of the second side walls is movably coupled to the second cross member. A cage has a first end coupled to the first and second side members and a second end coupled to the vertical member. The cage comprises a tray and a bracket that is coupled to the tray such that inner surfaces of the tray and the bracket define a housing configured for disposal of the ladder. The tubular carrier has a first end coupled to the first and second side members and a second end coupled to a mounting bracket of the second shelving unit. The mounting bracket is coupled to a lateral member that extends perpendicular to the third and fourth side members. The carrier comprises an inner surface defining a conduit.

In one embodiment, in accordance with the principles of the present disclosure, the shelving system indudes a vehicle, a first shelving unit, a second shelving unit, a cage and a carrier. The vehicle comprises an interior including a floor and first and second side panels. The interior is accessible through at least one rear door positioned between the first and second side panels and at least one side door that extends through one of the first and second side panels. The first shelving unit comprises first and second side members, a first cross member extending between and connecting the first side member with the second side member and a first container including a pair of spaced apart first side walls, one of the first side walls being movably coupled to the first cross member such that the first container extends through the at least one rear door when the first container is in an extended orientation. The second shelving unit is spaced apart from the first shelving unit and comprises third and fourth side members and a vertical member that is aligned with the third and fourth members along a transverse axis. A second cross member extends between and connects the third side member with the fourth side member. The second cross member is spaced apart from the vertical member. A second container includes a pair of spaced apart second side walls. One of the second side walls is movably coupled to the second cross member such that the second container extends through the at least one side door when the second container is in an extended orientation. The cage has a first end coupled to the first and second side members and a second end coupled to the vertical member. The cage comprises a tray and a bracket that is coupled to the tray such that inner surfaces of the tray and the bracket define a housing configured for disposal of a ladder. The carrier has a first end coupled to the first and second side members and a second end coupled to a mounting bracket of the second shelving unit. The mounting bracket is coupled to a lateral member that extends perpendicular to the third and fourth side members, the carrier comprising an inner surface defining a conduit.

BRIEF DESCRIPTION OF THE DRAWINGS

The present disclosure will become more readily apparent from the specific description accompanied by the following drawings, in which:

FIG. 7 is a side view, in part phantom, of components of the system shown in FIG. 1;

FIG. 8 is a side view, in part phantom, of components of the system shown in FIG. 1;

Like reference numerals indicate similar parts throughout the figures.

DETAILED DESCRIPTION

Figure 1:
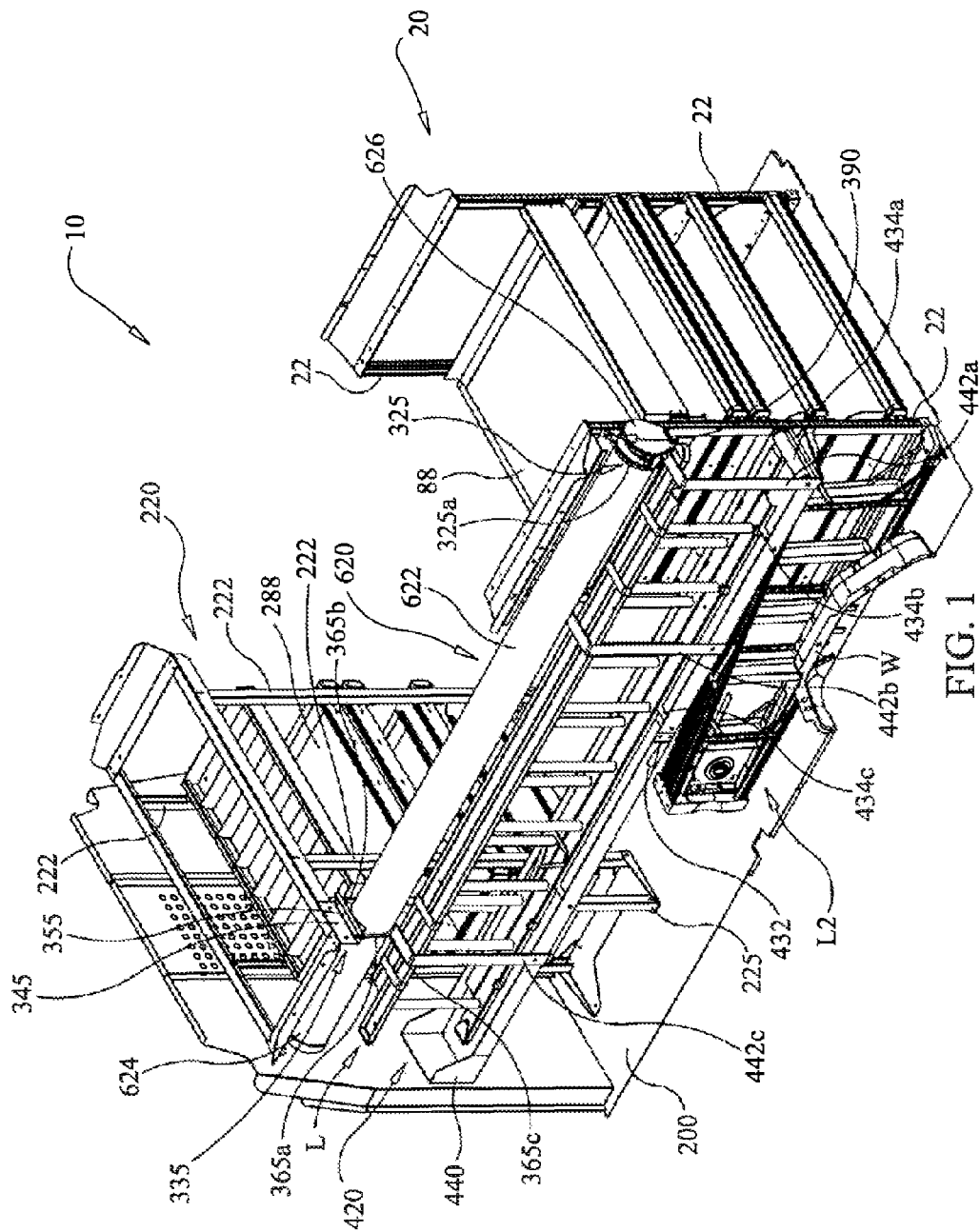
FIG. 1 is a perspective view of one embodiment of a shelving system in accordance with the principles of the present disclosure.

The exemplary embodiments of a shelving system and related methods of use are discussed in terms of devices for the storage of items during transport. The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a shelving system, related components and methods of employing the shelving system in accordance with the principles of the present disclosure. Alternate embodiments are also disclosed. Reference will now be made in detail to the exemplary embodiments of the present disclosure, which are illustrated in the accompanying figures. Turning to FIGS. 1-23, there are illustrated components of a shelving system 10.

The components of shelving system 10 can be fabricated from materials including metals, polymers and/or composites, depending on the particular application. For example, the components of system 10, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of system 10 may have material composites, including the above materials, to achieve various desired characteristics such as strength, rigidity, elasticity, performance and durability. The components of system 10, individually or collectively, may also be fabricated from a heterogeneous material such as a combination of two or more of the above-described materials. The components of system 10 can be extruded, molded, injection molded, cast, pressed and/or machined. The components of system 10 may be monolithically formed, integrally connected or include fastening elements and/or instruments, as described herein.

Figure 2:
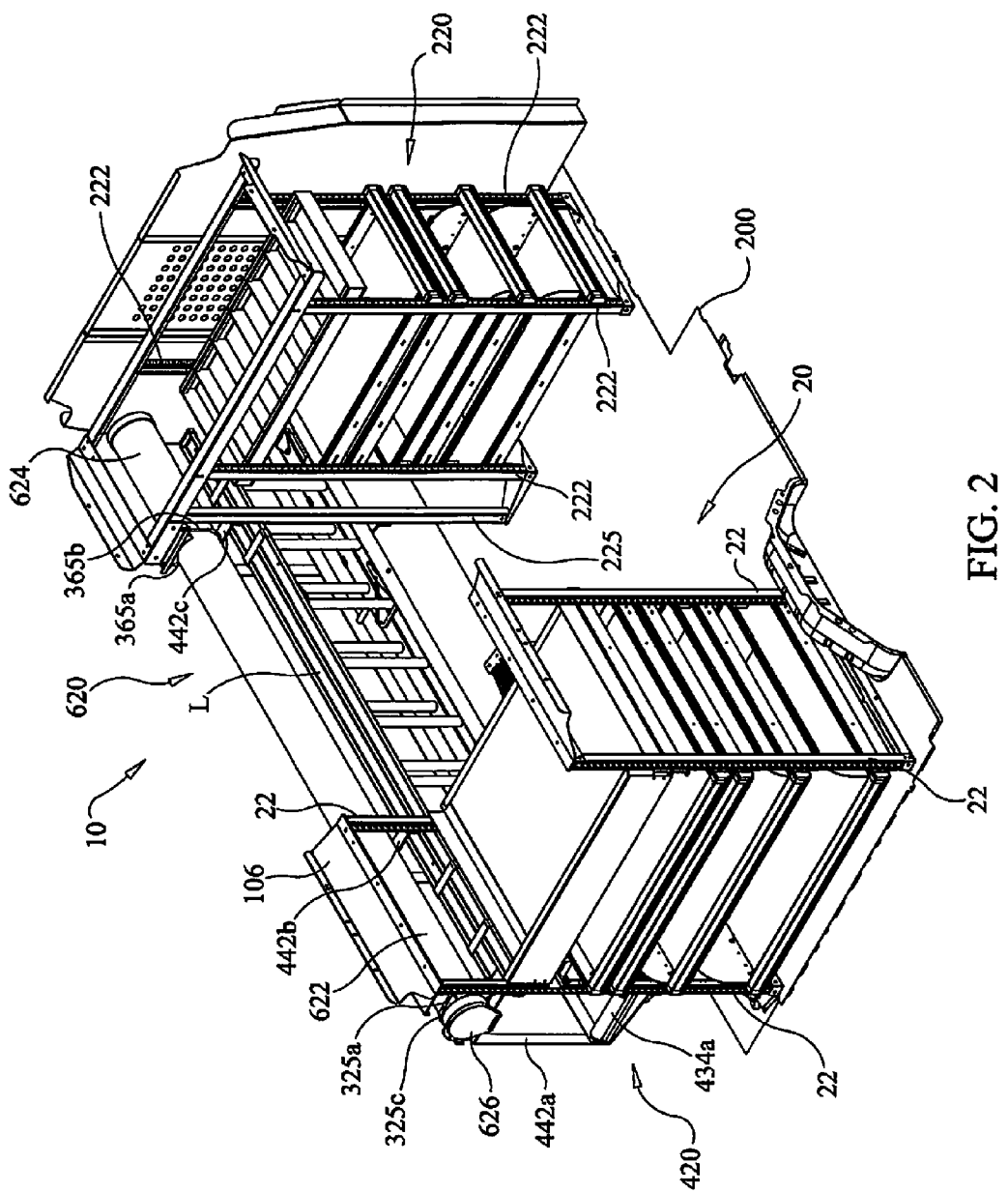
FIG. 2 is a perspective view of the system shown in FIG. 1.
Figure 3:
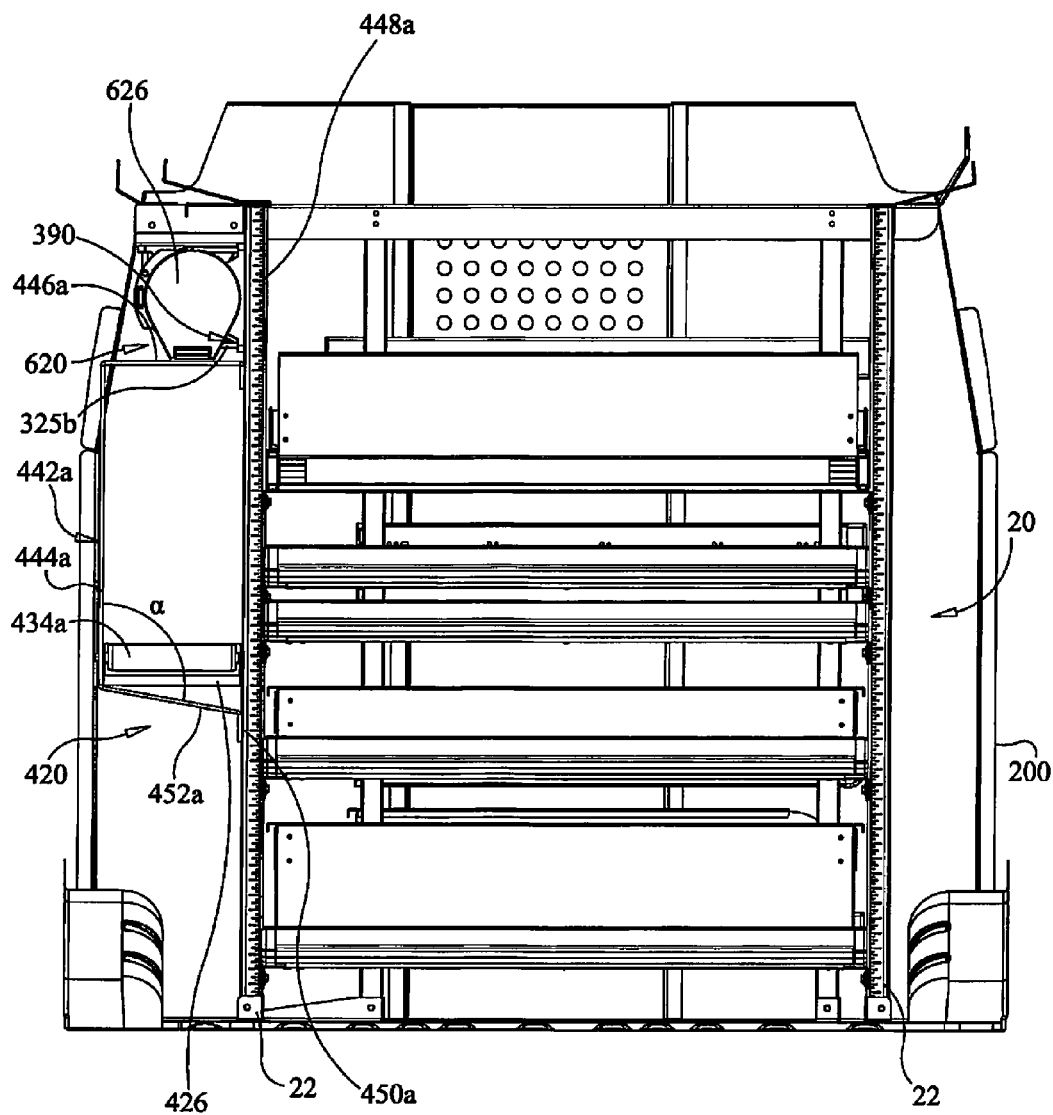
FIG. 3 is a rear view of the system shown in FIG. 1.

System 10 includes a first shelving unit 20, a second shelving unit 220, a ladder cage 420 and a carrier 620, as discussed herein. First shelving unit 20, second shelving unit 220, ladder cage 420 and carrier 620 are configured to be mounted in a vehicle, such as, for example, vehicle 200, as shown in FIGS. 1-3. In some embodiments, system 10 includes vehicle 200. It is envisioned that system 10 may include one or a plurality of first shelving units 20, one or a plurality of second shelving units 220, one or a plurality of ladder cages 420 and one or a plurality of carriers 620.

It is envisioned that ladder cage 420 and/or carrier 620 can be variously configured within an interior of vehicle 200, depending upon the arrangement of first and second shelving units 20, 220 within vehicle 200. In some embodiments, first and second shelving units 20, 220 are mounted to vehicle 200 and ladder cage 420 and/or carrier 620 is/are mounted to first and second shelving units 20, 220. In some embodiments, first and second shelving units 20, 220 are mounted to vehicle 200 and ladder cage 420 and/or carrier 620 is/are mounted to first shelving unit 20 without being mounted to second shelving unit 220. In some embodiments, first and second shelving units 20, 220 are mounted to vehicle 200 and ladder cage 420 and/or carrier 620 is/are mounted to second shelving unit 220 without being mounted to first shelving unit 20. In some embodiments, first and second shelving units 20, 220 are mounted to vehicle 200 and ladder cage 420 and/or carrier 620 is/are mounted to vehicle 200 without being mounted to first shelving unit 20 or second shelving unit 220.

It is envisioned that ladder cage 420 and/or carrier 620 can be variously configured within the interior of vehicle 200, depending upon the arrangement of doors of vehicle 200. In some embodiments, ladder cage 420 is configured to allow a ladder stored in ladder cage 420 to be removed through one or more rear doors of vehicle 200. In some embodiments, carrier 620 is configured to allow an item stored in carrier 620 to be removed through one or more rear doors of vehicle 200. In some embodiments, ladder cage 420 is configured to allow a ladder stored in ladder cage 420 to be removed through one or more side doors of vehicle 200. In some embodiments, carrier 620 is configured to allow an item stored in carrier 620 to be removed through one or more side doors of vehicle 200.

It is envisioned that ladder cage 420 may be adapted for use in buildings or other structures. For example, ladder cage 420 may be mounted to an interior or exterior wall of a shed or garage in order to efficiently store a ladder L in a manner that allows ladder L to be easily inserted into and removed from ladder cage 420, as discussed herein.

Figure 4:
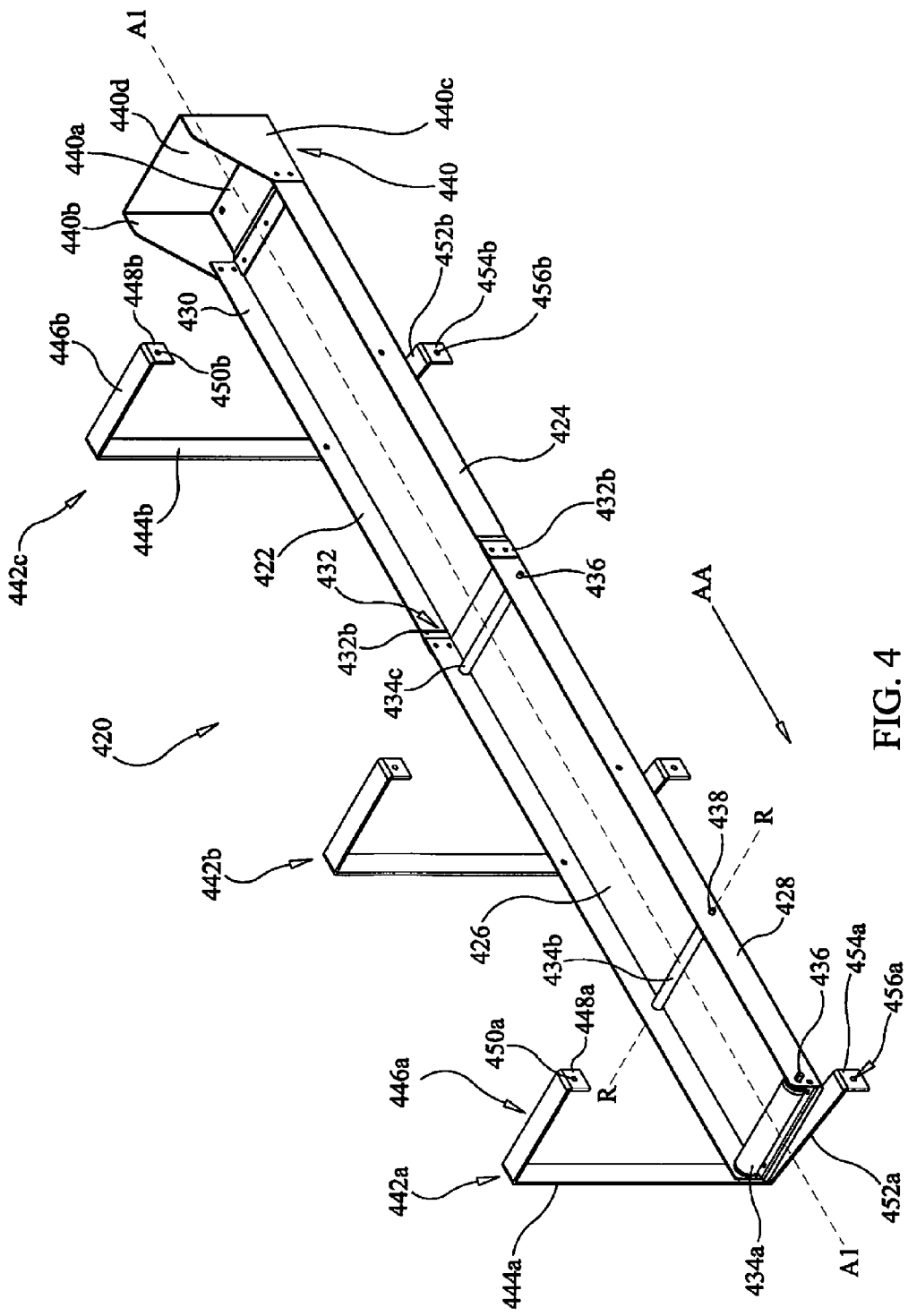
FIG. 4 is a perspective view of components of the system shown in FIG. 1.

Ladder cage 420 includes opposite first and second sidewalls 422, 424 that each extend parallel to a longitudinal axis A1 defined by ladder cage 420, as best shown in FIG. 4. In some embodiments, a bottom panel 426 extends between and connects first and second sidewalls 422, 424. Bottom panel 426 and first and second sidewalls 422, 424 form a tray configured for disposal of ladder L, as shown in FIGS. 1 and 2, for example. Bottom panel 426 is configured to engage stringers or rails of ladder L to maintain ladder L within the tray formed by bottom panel 426 and first and second sidewalls 422, 424. That is, stringers or rails of ladder L may rest upon bottom panel 426 to prevent at least a portion of ladder L from falling through ladder cage 420. It is envisioned that this configuration may protect items in vehicle 200 that are positioned below ladder cage 420 as ladder L is being inserted into or removed from ladder cage 420.

In some embodiments, ladder cage 420 does not include bottom panel 426. Rather, the bottom portion of ladder cage 420 is open to allow a portion of ladder L to be positioned below first and second sidewalls 422, 424 as ladder L is being inserted into or removed from ladder cage 420. That is, in some embodiments it may be desirable to allow the top of ladder L or the bottom of ladder 420 to dip below first and second sidewalls 422, 424 as the opposite end of ladder 420 is tilted upwards. It is envisioned that the lack of bottom panel 426 can allow greater tilting of ladder L as ladder L is being inserted into or removed from ladder cage 420.

Ladder cage 420 extends along longitudinal axis A1 between a first end 428 and an opposite second end 430. In some embodiments, first end 428 is removably coupled to second end 430 such that first end 428 can be removed from second end 430 as ladder cage 420 is inserted or removed from vehicle 200. For example, in some embodiments, ladder cage 420 may include a disassembly joint 432, as best shown in FIG. 4. Disassembly joint 432 is formed by edges 432a of first and second sidewalls 422, 424 of second end 430 that overlap edges 432b of first and second sidewalls 422, 424 of first end 428 such that inner surfaces of first and second sidewalls 422, 424 of second end 430 engage outer surfaces of first and second sidewalls 422, 424 of first end 428. In some embodiments, edges 432b of first and second sidewalls 422, 424 of first end 428 overlap edges 432a of first and second sidewalls 422, 424 of second end 430 such that inner surfaces of first and second sidewalls 422, 424 of first end 428 engage outer surfaces of first and second sidewalls 422, 424 of second end 430. In some embodiments, first end 428 and second end 430 are monolithically formed such that first end 428 cannot be removed from second end 430 without destroying ladder cage 420 in order to provide rigidity to ladder cage 420. In some embodiments, first end 428 and second end 430 can be variously connected with one another, such as, for example, monolithic, integral connection, frictional engagement, threaded engagement, mutual grooves, screws, adhesive, nails, barbs and/or raised element.

First end 428 of ladder cage 420 includes a plurality of spaced apart rollers 434a, 434b, 434c. In some embodiments, first end 428 of ladder cage 420 includes additional rollers that are the same as at least one of rollers 434a, 434b, 434c or similar to at least one of rollers 434a, 434b, 434c. Rollers 434a, 434b, 434c are each configured to facilitate insertion of ladder L into ladder cage 420 and/or removal of ladder L from ladder cage 420. In some embodiments, second end 430 of ladder cage 420 is free of any rollers that are the same as at least one of rollers 434a, 434b, 434c or similar to at least one of rollers 434a, 434b, 434c in order to allow one end of ladder L to slide along bottom panel 426 as an opposite end of ladder L moves along rollers 434a, 434b, 434c. In embodiments where ladder cage 420 does not include bottom panel 426, second end 430 of ladder cage 420 may be free of rollers to allow one end of ladder L to dip below first and second sidewalls 422, 424 as the opposite end of ladder 420 is tilted upwards. In some embodiments, second end 430 of ladder cage 420 includes one or a plurality of rollers that are the same as at least one of rollers 434a, 434b, 434c or similar to at least one of rollers 434a, 434b, 434c.

Rollers 434a, 434b, 434c each extend between first and second sidewalls 422, 424. In particular, rollers 434a, 434b, 434c each include ends 436 that extend through openings 438 in first and second sidewalls 422, 424 such that rollers 434a, 434b, 434c are each rotatable relative to first and second sidewalls 422, 424 and bottom panel 426 about a rotation axis R that extends perpendicular to longitudinal axis A1. In some embodiments, rollers 434a, 434b, 434c are spaced apart from bottom panel 426 to facilitate rotation of rollers 434a, 434b, 434c about rotation axes R. In some embodiments, rollers 434a, 434b, 434c engage bottom panel 426 to create friction as rollers 434a, 434b, 434c rotate about rotation axes R in order to prevent rollers 434a, 434b, 434c from rotating too rapidly. In some embodiments, rotation axes R may be disposed at alternate orientations, relative to longitudinal axis A1, such as, for example, transverse, perpendicular and/or other angular orientations such as acute or obtuse, co-axial and/or may be offset or staggered.

Figure 5:
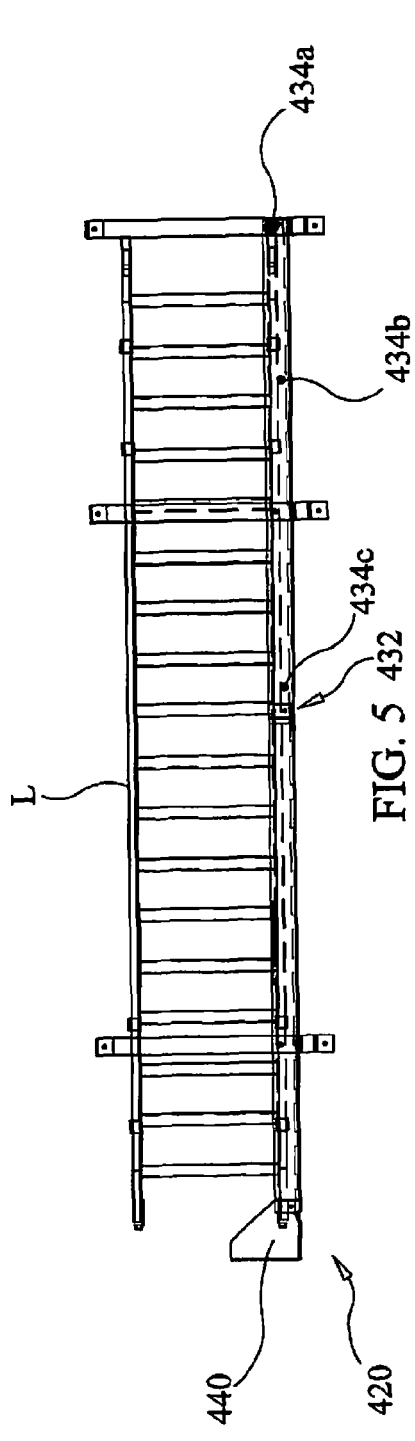
FIG. 5 is a side view, in part phantom, of components of the system shown in FIG. 1.
Figure 6:
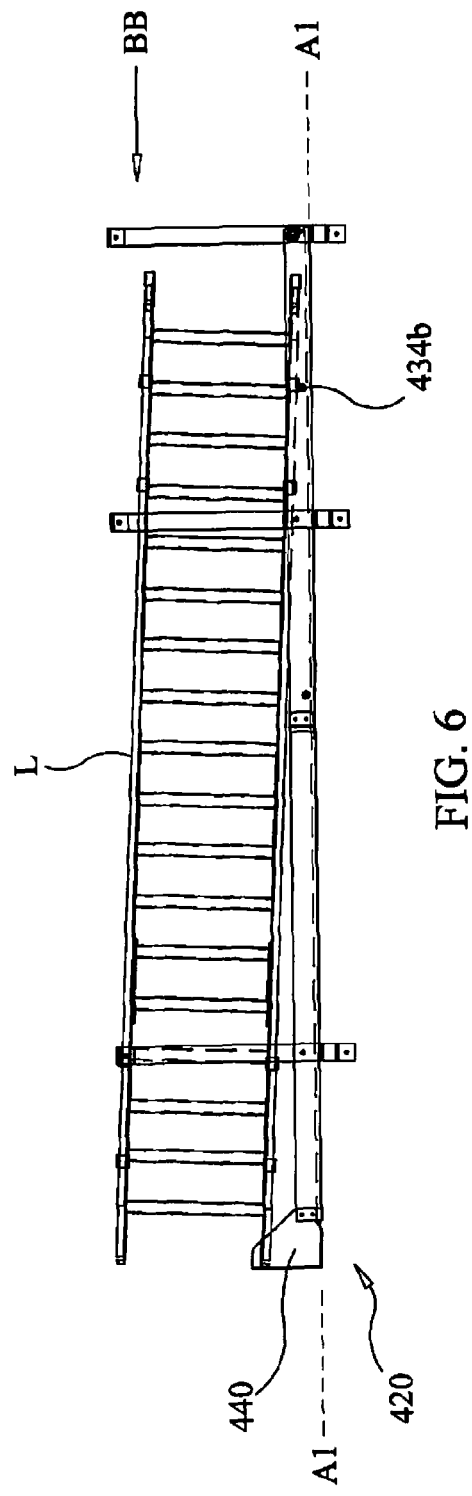
FIG. 6 is a side view, in part phantom, of components of the system shown in FIG. 1.

Rollers 434a, 434b, 434c each have a diameter that is less than the heights of first and second sidewalls 422, 424 such that none of rollers 434a, 434b, 434c extend above top surfaces of first and second sidewalls 422, 424 to maintain ladder L between first and second sidewalls 422, 424 so as to prevent movement of ladder L relative to ladder cage 420 along axes R. In some embodiments, rollers 434a, 434b, 434c each have the same diameter such that ladder L is parallel with longitudinal axis A1 when a side surface of a stringer or rail of ladder L is positioned upon rollers 434a, 434b, 434c. In some embodiments, roller 434a has a diameter that is greater than that of rollers 434b, 434c such that a bottom surface of a stringer or rail of ladder L engages roller 434a while a side surface of the stringer or rail of ladder L is positioned upon rollers 434, 434, as shown in FIG. 5. This configuration allows roller 434a to act as a brake mechanism for ladder L as ladder L sits on rollers 434b, 434c. That is, the bottom surface of the stringer or rail of ladder L engages roller 434a to prevent ladder L from moving along longitudinal axis A1 in the direction shown by arrow AA in FIG. 4.

Second end 430 of ladder cage 420 includes an end stop 440. End stop 440 includes a bottom surface 440a that is continuous with bottom panel 426, a first side surface 440b that is continuous with first sidewall 422, a second side surface 440c that is continuous with second sidewall 424 and an end surface 440d that extends between and connects first side surface 440b and second side surface 440c. That is, there are no gaps between bottom surface 440a and bottom panel 426, no gaps between first side surface 440b and first sidewall 422 and no gaps between second side surface 440c and second sidewall 424.

First side surface 440b is tapered between end surface 440d and first sidewall 422 such that first side surface 440b has a greater height adjacent end surface 440d than it does adjacent first sidewall 422. Likewise, second side surface 440c is tapered between end surface 440d and second sidewall 424 such that first side surface 440b has a greater height adjacent end surface 440d than it does adjacent first sidewall 422. End surface 440d has a height that is equal to maximum heights of first and second side surfaces 440b, 440c. The configuration of end stop 440 allows one end of ladder L to engage end surface 440d while ladder L rests atop roller 434b in a manner that prevents ladder L from moving along longitudinal axis A1 in the direction shown by arrow BB in FIG. 6.

The configuration of ladder cage 420 discussed above allows ladder cage 420 to store ladder L while vehicle 200 is in transit, while also allowing ladder L to be easily inserted and removed from ladder cage 420. For example, as shown in FIG. 7, one end of ladder L may be lifted and positioned atop roller 434a such that ladder L extends transverse to longitudinal axis A1 in order to allow ladder L to be rolled out of ladder cage 420 via rotation of roller 434a and at least one of rollers 434b, 434c. Once ladder L is rolled out about half way, ladder L is rolled out of ladder cage 40 via rotation of roller 434a, while ladder L is spaced apart from rollers 434b, 434c, as shown in FIG. 8. Ladder L extends parallel to longitudinal axis A1 as ladder L exits ladder cage 420, as also shown in FIG. 8.

Ladder cage 420 includes spaced apart brackets to couple ladder cage 420 to another structures, such as, for example, first shelving unit 20, second shelving unit 220, a portion of vehicle 200, or a wall of a building. In particular, ladder cage 420 includes a bracket 442a at first end 428, a bracket 442b at second end 430 and a bracket 442c positioned between first and second ends 428, 430. It is envisioned that ladder cage 420 may include additional brackets that are the same as at least one of brackets 442a, 442b, 442c or similar to at least one of brackets 442a, 442b, 442c. Brackets 442a, 442b are positioned between first and second ends 24, 26 of the first pair of side members 22 such that when brackets 442a, 442b are coupled to the first pair of side members 22, ladder cage 420 will be spaced apart from the floor of vehicle 200. Likewise, bracket 442c is positioned between opposite ends of vertical member 225 such that when bracket 442c is coupled to vertical member 225, ladder cage 420 will be spaced apart from the floor of vehicle 200. This allows items to be positioned below ladder cage 420, as shown in FIG. 1, for example. It is envisioned that the components of system 10 may be variously configured such that 442a, 442b, 442c are coupled to side members 22 and vertical member 225 in a manner that positions ladder cage 420 such that ladder cage engages the floor of vehicle 200 to allow items to be positioned above ladder cage 420, between ladder cage 420 and carrier 620.

Bracket 442a includes a first portion 444a that extends perpendicular to longitudinal axis A1 and engages first sidewall 422, a second portion 446a that extends perpendicular to first portion 444a and a third portion 452a that extends at an obtuse angle a relative to first portion 444a, as shown in FIG. 3. Third portion 452a is spaced apart from bottom panel 426. Second and third portions 446a, 452a include flanges 448a, 454a, respectively. Flanges 448a, 454a each extend parallel to first portion 444a. Flanges 448a, 454a include openings 450a, 456a, respectively. Openings 450a, 456a are configured for disposal of fasteners, such as, for example, bolts or screws that extend into another structure, such as, for example, first shelving unit 20, a wall or side panel of a vehicle, a wall of a building, etc. In some embodiments, angle a is greater than 90 degrees and less than 180 degrees. In some embodiments, angle a is between 91 degrees and 135 degrees. First portion 444a engages an outer surface of first sidewall 422 in order to mount ladder cage 420 to a surface that faces an outer surface of second sidewall 424. In some embodiments, first portion 444a engages second sidewall 424, rather than first sidewall 422, to fix ladder cage 420 to a surface that faces an outer surface of first sidewall 422. In some embodiments, first portion 444a, second portion 446a and a third portion 452a may be disposed at alternate orientations, relative to longitudinal axis A1 and/or first portion 444a, such as, for example, transverse, perpendicular and/or other angular orientations such as acute or obtuse, co-axial and/or may be offset or staggered.

Brackets 442b, 442c each include a first portion 444b that extends perpendicular to longitudinal axis A1 and engages first sidewall 422, a second portion 446b that extends perpendicular to first portion 444b and a third portion 452b that extends perpendicular to first portion 444b. Third portions 452b engage bottom panel 426. Second and third portions 446b, 452b include flanges 448b, 454b, respectively. Flanges 448b, 454b each extend parallel to first portion 444b. Flanges 448b, 454b include openings 450b, 456b, respectively. Openings 450b, 456b are configured for disposal of fasteners, such as, for example, bolts or screws that extend into another structure, such as, for example, first shelving unit 20, second shelving unit 220, a wall or side panel of a vehicle, a wall of a building, etc. First portions 444b engage the outer surface of first sidewall 422 in order to mount ladder cage 420 to a surface that faces an outer surface of second sidewall 424. However, in some embodiments, first portions 444b engage second sidewall 424, rather than first sidewall 422, to fix ladder cage 420 to a surface that faces an outer surface of first sidewall 422. In some embodiments, first portions 444b, second portions 446b and third portions 452b may be disposed at alternate orientations, relative to longitudinal axis A1 and/or first portion 444a, such as, for example, transverse, perpendicular and/or other angular orientations such as acute or obtuse, co-axial and/or may be offset or staggered. In some embodiments, ladder cage 420 may be mounted to an exterior of a vehicle, such as, for example, a roof of vehicle 200. In some embodiments, system 10 includes at least one additional ladder cage, such as, for example, ladder cage 420 that may be mounted within the interior of vehicle 200, such as, for example, to a frame or sidewall of vehicle 200, or to an exterior of a vehicle, such as, for example, a roof of vehicle 200.

First shelving unit 20 includes a first pair of side members 22 opposite a second pair of side members 22 and second shelving unit 220 includes a vertical member 225. In some embodiments, bracket 442a is coupled to one of the first pair of side members 22, bracket 442b is coupled to the other one of the first pair of side members 22 and bracket 442c is coupled to vertical member 225. In particular, fasteners are positioned through each of openings 450a, 456a, 450b, 456b and into the first pair of side members and vertical member 225, respectively. It is envisioned that the first pair of side members 22 may entirely support first end 428 of ladder cage 420. That is, no portion of vehicle 200 or other components of first shelving unit 20 are required to support first end 428 of ladder cage 420. It is further envisioned that vertical member 225 may entirely support second end 430 of ladder cage 420. That is, no portion of vehicle 200 or other components of second shelving unit 220 are required to support second end 430 of ladder cage 420.

Figure 10:
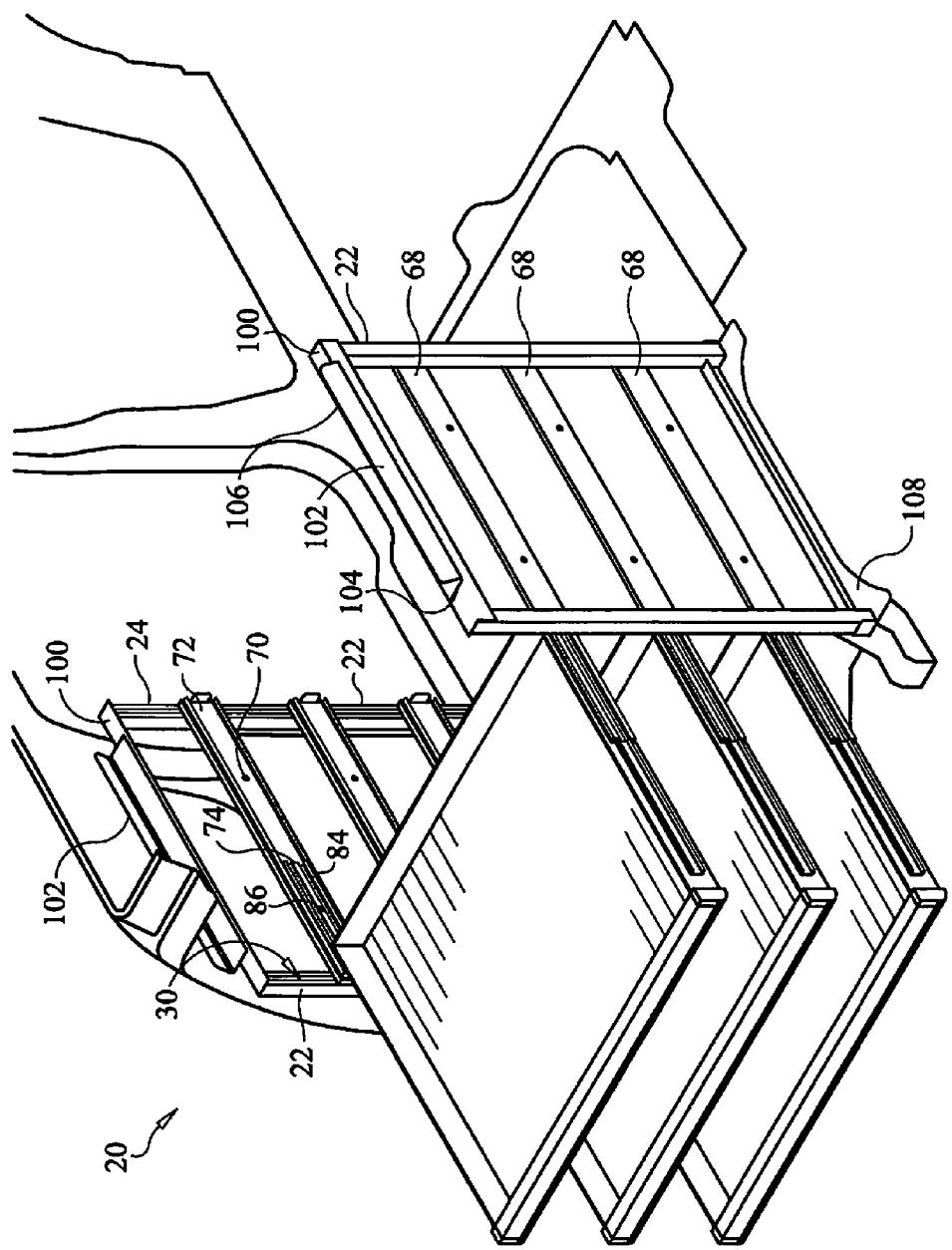
FIG. 10 is a perspective view of components of the system shown in FIG. 1.
Figure 11:
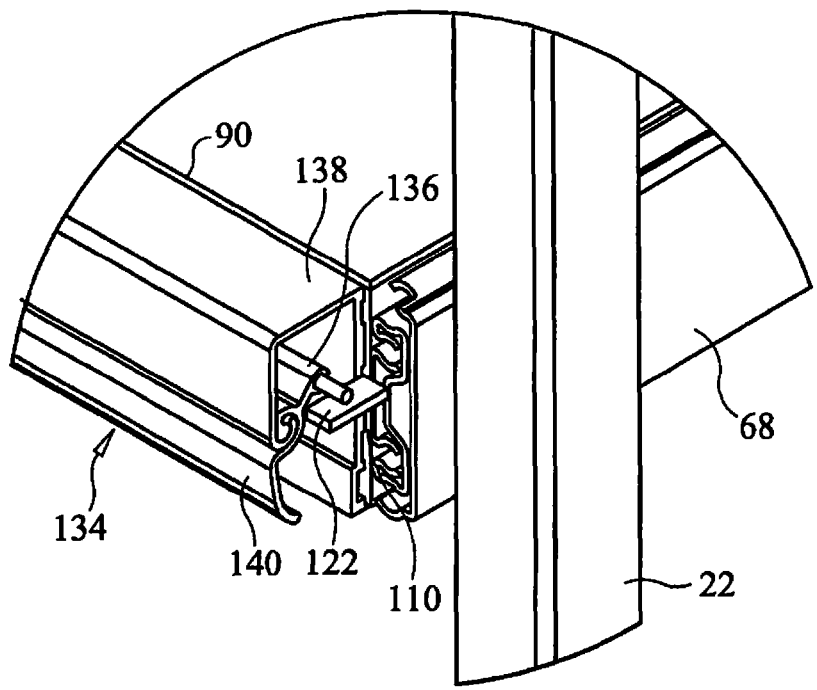
FIG. 11 is a perspective view of components of the system shown in FIG. 1 at Detail A in FIG. 9, with components removed.
Figure 12:
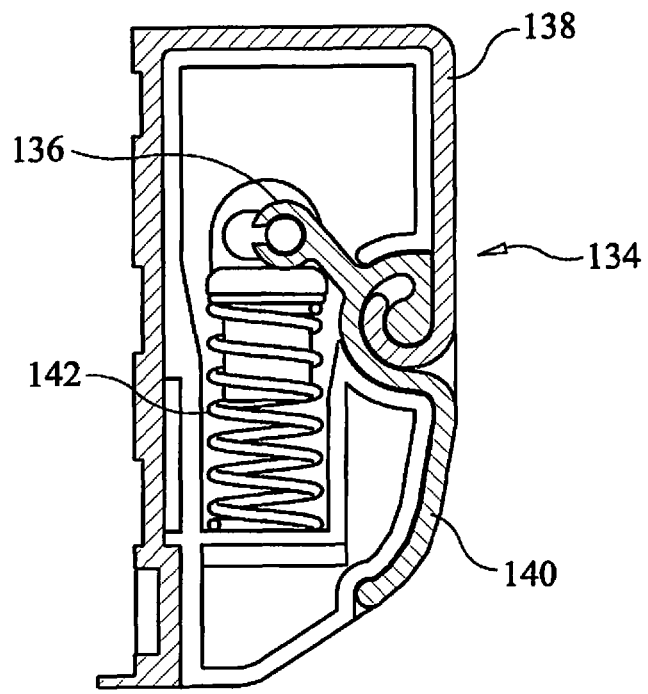
FIG. 12 is a side, cross sectional view of components of the system shown in FIG. 1 along lines B-B in FIG. 9 at Detail C in FIG. 9.
Figure 20:
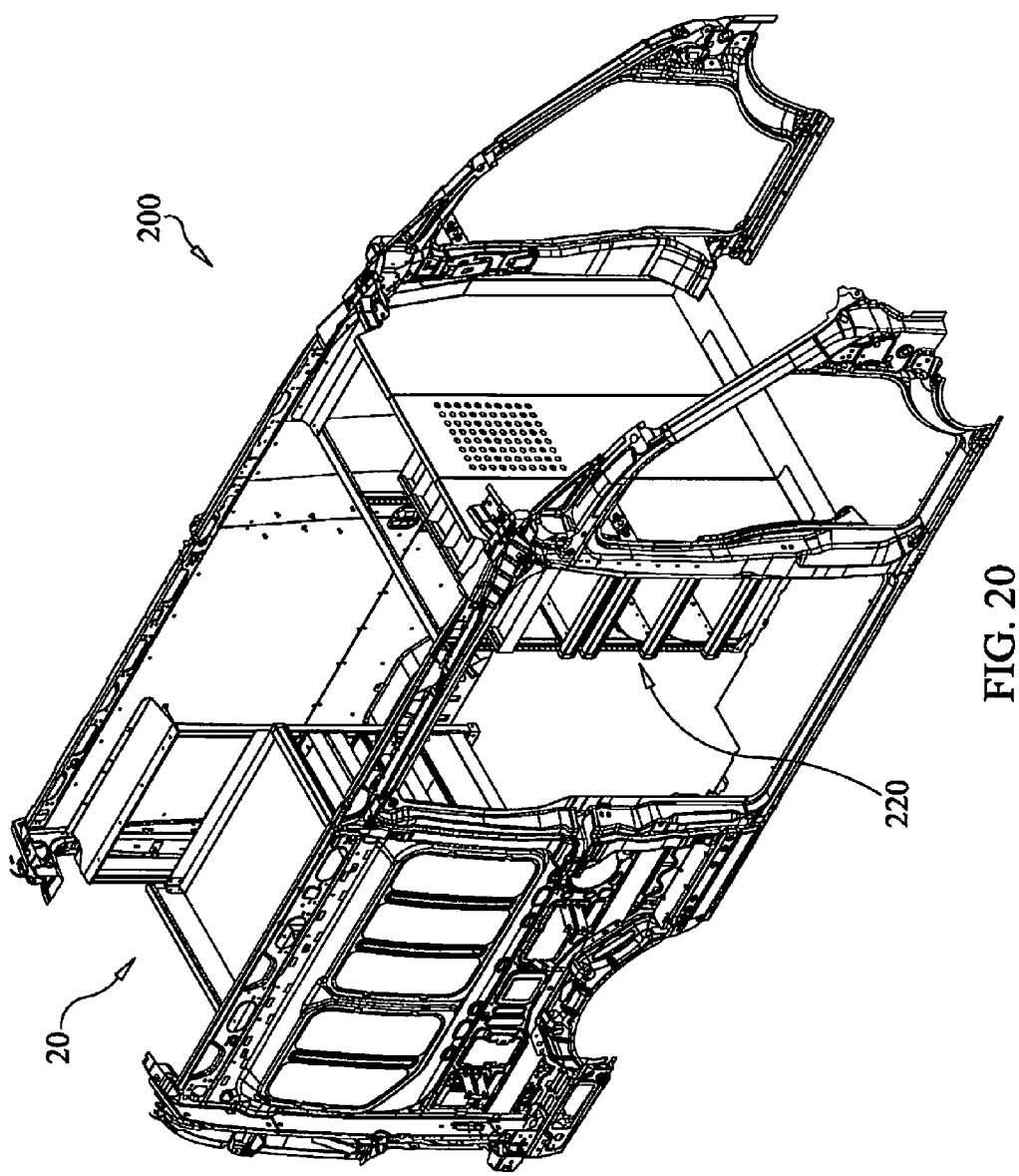
FIG. 20 is a perspective view of components of the system shown in FIG. 1.

In some embodiments, first shelving unit 20 is configured to be mounted in a vehicle, such as, for example, vehicle 200 such that first shelving unit 20 is accessible through one or more rear doors of vehicle 200, as shown in FIGS. 10 and 20, for example. That is, first shelving unit 20 may be configured such that drawers or containers of first shelving unit 20 may be positioned outside of vehicle 200 by moving such drawers or containers through an opening defined by one or more rear doors of vehicle 200, when the one or more rear doors is/are in an open position.

Side members 22 of first shelving unit 20 each extend along a longitudinal axis A2 between a first end 24 and a second end 26. Side members 22 each have a length defined by the distance between ends 24, 26. The lengths of each of side members 22 is the same. Side members 22 have a uniform width or diameter along the entire length of each side member 22. Side members 22 each include an inner surface 28 defining a first channel 30. First channels 30 each extend the entire length of each side member 22. Inner surfaces 28 of the first pair of side members 22 face inner surfaces of the second pair of side members 22. In some embodiments, side members 22 and/or first channel 30 may have various cross section configurations, such as, for example, oval, oblong, triangular, rectangular, square, polygonal, irregular, uniform, non-uniform, variable, tubular and/or tapered, depending upon the requirements of a particular application. In some embodiments, each first channel 30 is capped on either ends thereof such that each first channel 30 has a length that is less than the length of a respective side member 22 to prevent a component, such as, for example, a slide 42 disposed in first channel 30 from moving out of first channel 30.

Side members 22 each include a planar first wall 32 extending between parallel planar side walls 34. First walls 32 of the first pair of side members 22 are aligned with one another and first walls 32 of the second pair of side members 22 are aligned with one another. Side walls 34 each include an inwardly facing end wall 36 that extends perpendicular to side walls 34. End walls 36 are parallel to first wall 32 and each include an extension 38 extending toward first wall 32. Extensions 38 each include a planar end surface 40 extending parallel to first wall 32 configured to engage a portion of slide 42, as will be described. In some embodiments, all or only a portion of first wall 32, side walls 34, extensions 38 and/or end surfaces 40 may be variously configured and dimensioned, such as, for example, planar, concave, polygonal, irregular, uniform, non-uniform, staggered, tapered, consistent or variable, depending on the requirements of a particular application. In some embodiments, first wall 32, side walls 34, extensions 38 and/or end surfaces 40 may be disposed at alternate orientations, relative to one another and/or longitudinal axis A2, such as, for example, parallel, transverse, perpendicular and/or other angular orientations such as acute or obtuse, co-axial and/or may be offset or staggered, depending upon the requirements of a particular application.

Figure 9:
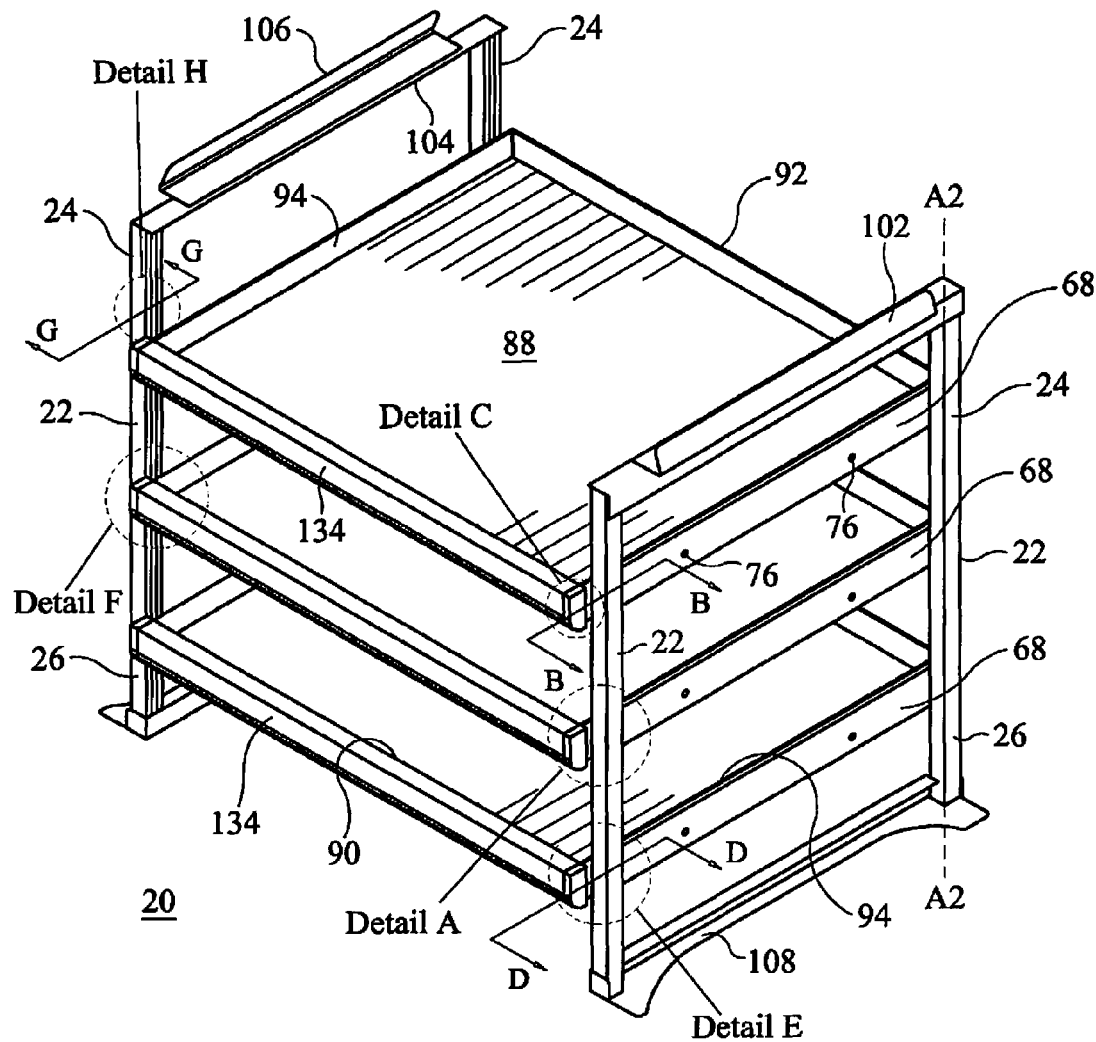
FIG. 9 is a perspective view of one embodiment of components of the system shown in FIG. 1.

At least one slide 42 is movably disposed in each first channel 30. It is envisioned that system 10 may include one or a plurality of slides 42 disposed in each first channel. As best shown in FIGS. 9 and 10, each first channel 30 includes three slides 42 movably disposed therein. It is envisioned that each of side members 22 includes the same number of slides 42 positioned therein. That is, each side member 22 that makes up the first pair of side members 22 includes the same number of slides as each side member 22 that makes up the second pair of side members 22.

Figure 17:
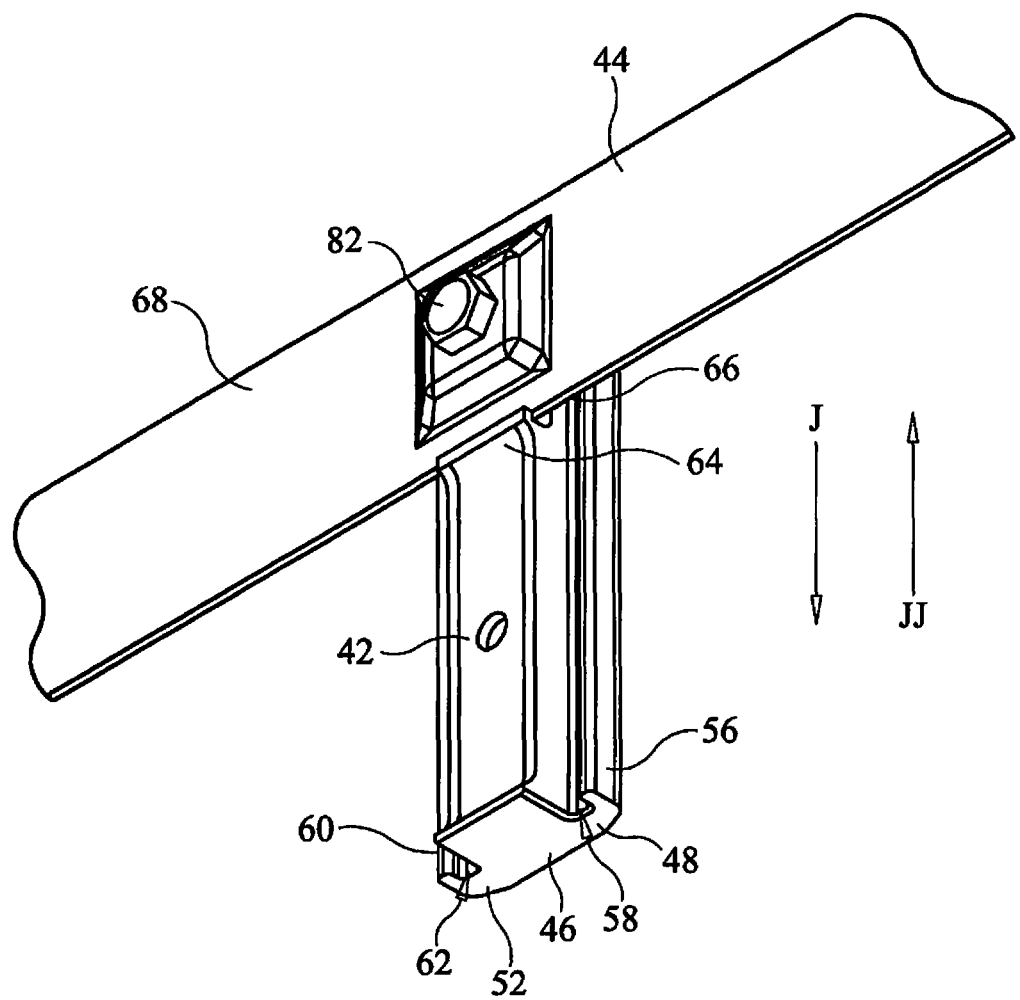
FIG. 17 is a breakaway, perspective view of components of the system shown in FIG. 1 at detail F in FIG. 9.
Figure 18:
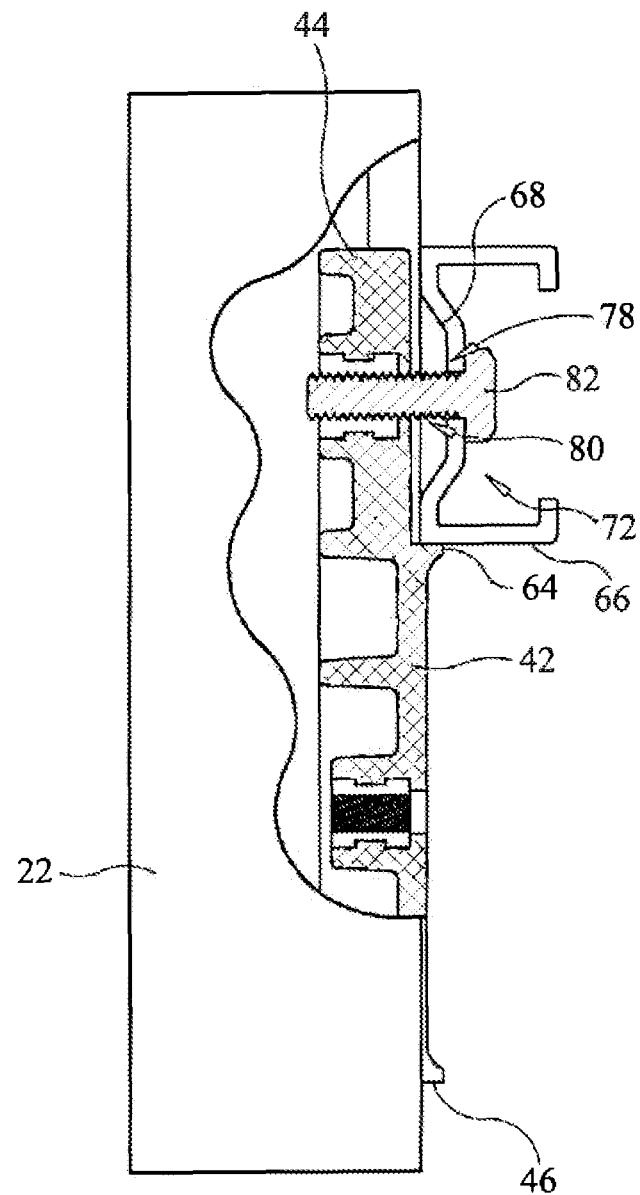
FIG. 18 is a side view, in partial cross section, of components of the system shown in FIG. 1.
Figure 19:
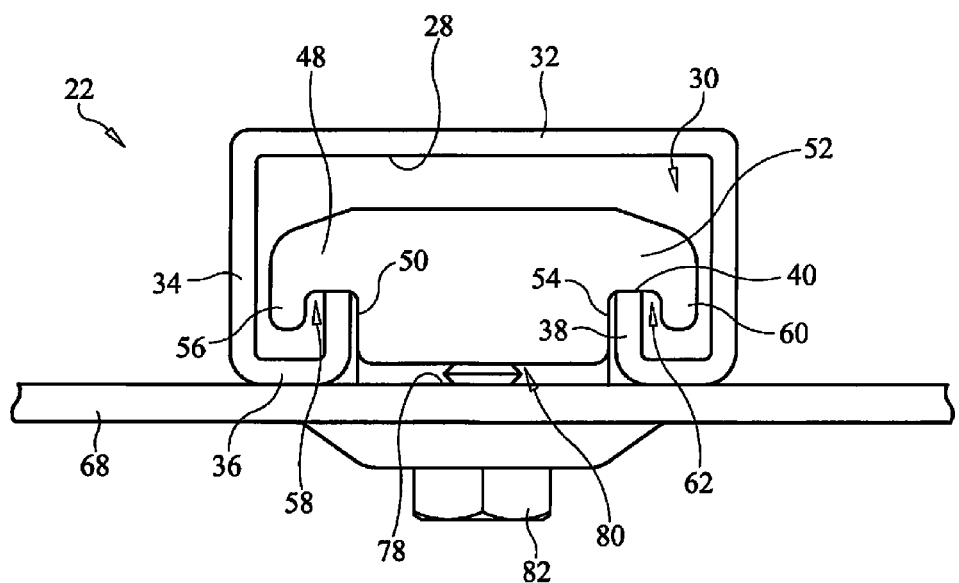
FIG. 19 is a breakaway top, cross sectional view of components of the system shown in FIG. 1 along lines G-G in FIG. 9 at Detail H in FIG. 9.

Slides 42 each include an elongated body extending along longitudinal axis A2 between a first end 44 and a second end 46, as best shown in FIG. 17. The body of slide 42 includes a first arm 48 extending perpendicular to longitudinal axis A2 from a first side surface 50 of the body and a second arm 52 extending perpendicular to longitudinal axis A2 from an opposite second side surface 54 of the body, as best shown in FIG. 19. First arm 48 includes a first wing 56 extending perpendicular to the first arm 48 and defining a first cavity 58. Second arm 52 includes a second wing 60 extending perpendicular to second arm 52 and defining a second cavity 62. First cavity 38 is spaced apart from second cavity 62 by the body of slide 42. One extension 38 of a respective side member 22 is disposed in first cavity 58 and one extension 38 of the respective side member 22 is disposed in second cavity 62 such that slide 42 is movable relative to side member 22 within first channel 30. One end surface 40 is configured to engage first arm 48 and one end surface 40 is configured to engage second arm 52. Slide 42 has a maximum width that is less than a maximum width of first channel 30 such that outer surfaces of first wing 56 and second wing 60 are spaced apart from inner surface 28 when slide 42 is disposed in first channel 30 to allow slide 42 to translate within first channel 30 with minimal resistance. In some embodiments, first arm 48, first side surface 50, second arm 52, second side surface 54, first wing 56, first cavity, second wing 60 and/or second cavity 62 may be disposed at alternate orientations, relative to one another and/or longitudinal axis A2, such as, for example, parallel, transverse, perpendicular and/or other angular orientations such as acute or obtuse, co-axial and/or may be offset or staggered, depending upon the requirements of a particular application.

Slides 42 each include a projection 64 extending perpendicular to axis A2 configured to engage a bottom surface 66 of a cross member 68, as best shown in FIG. 17, to prevent cross member 68 from translating axially relative to slide 42 in the direction shown by arrow J, while allowing cross member 68 to translate axially relative to slide 42 in the direction shown by arrow JJ. One cross member 68 extends between and connects each of the slides 42 positioned in first channels 30 of the first pair of side members 22 and one cross member 68 extends between and connects each of the slides 42 positioned in first channels 30 of the second pair of side members 22. In some embodiments, a plurality of cross members 68 extend between and connect slides 42 positioned in first channels 30 of the first pair of side members and an equal number of cross members 68 extend between and connect slides 42 positioned in first channels 30 of the second pair of side members such that the cross members 68 connecting the first pair of side members 22 are parallel aligned with the cross members 68 connecting the second pair of side members 22.

Cross members 68 each include an inner surface 70 defining a second channel 72 configured for movable disposal of a guide member 74, as will be described. Cross members 68 each include spaced apart threaded openings 78, each of the openings 78 being aligned with a threaded aperture 80 in one of the slides 42. A threaded fastener 82 extends through a respective opening 78 and a respective aperture 80 to fix cross member 68 with slides 42. Fasteners 82 are moveable between a first position in which an outer surface of cross member 68 is spaced apart from outer surfaces of side members 22 and the slides 42 can translate axially within first channels 30 and a second position in which the outer surface of cross member 68 engages the outer surfaces of side members 22 and the slides 42 are fixed relative to side members. When fasteners 82 are in the second position, end walls 36 engage the outer surface of cross member 68 and end surfaces 40 engage arms 48, 52, as best shown in FIG. 19. When fasteners 82 are in the second position, the body of slide 42 is spaced apart from cross member 68. That is, the only portion of each slide 42 that contacts a respective side member 22 and/or cross member 68 is first arm 48 and second arm 52. This configuration allows fasteners 82 to move between the first and second positions by unthreading or threading a respective fastener 82 through a respective opening 78 and a respective aperture 80 only slightly. That is, fastener 82 need only be rotated relative to slide 42 and/or cross member 68 one or a few turns to move fastener 82 from between the first and second positions. When fasteners 82 are in the first position, slides 42 can translate within first channels 30 to adjust the position of slides 42 relative to side members 22. Fasteners 82 are then moved from the first position to the second position to fix the position of slides 42 relative to side members 22. As discussed herein, this configuration allows the height of drawers or containers 88 of first shelving unit 20 to be selectively adjusted so that each drawer or container 88 is spaced apart from an adjacent drawer or container 88 a selected distance and/or each drawer or container 88 is positioned at a selected distance from the floor of a vehicle, for example.

In some embodiments, side members 22 each include indicia on an outer surface thereof, such as, for example, calibrated lines to measure distances. Such indicia may be used to ensure that four slides 42, each disposed in a first channel 30 of one of the side members 22 that make up the first and second pairs of side members 22 may each be aligned to define a first level. It is envisioned that the indicia may also be used to align other levels of slides 42 before or after aligning the first level.

Each guide member 74 is movably disposed in a second channel 72 and includes an inner surface 84 defining a third channel 86. Containers 88 each include a first wall 90 and a second wall 92 extending parallel to first wall 90. Container 88 each include a pair of spaced apart side walls 94 extending between first and second walls 90, 92. Outer surfaces of each side wall 94 includes a rail 96. One rail 96 of one container 88 is movably disposed in a third channel 86 of a guide member 74 extending between the first pair of side members 22 and one rail 96 of the container 88 is movably disposed in a third channel 86 of an aligned guide member 74 extending between the second pair of side members 22. Container 88 includes a recessed tray 98 positioned between first and second walls 90, 92 and between the side walls 94. Tray 98 is maintained in a substantially horizontal orientation relative to axis A2 when container 88 translates within third channel 86 and guide member 74 translates within second channel 72. First shelving unit 20 may indude one or a plurality of containers 88. It is envisioned that the number of containers 88 included corresponds to the number of slides 42 and/or the number of cross members 68 or guide members 74. That is, first shelving unit 20 includes one container 88 for every four slides 42 and one container 88 for every two cross members 68 or every two guide members 74.

A first upper member 100 extends between and connects first ends 24 of the first pair of first members 22 and a second upper member 100 extends between and connects first ends 24 of the second pair of first members 22. Each upper member 100 includes a bracket 102 having a first surface 104 extending perpendicular to axis A2 and a second surface 106 disposed at an acute angle relative to first surface 104. In some embodiments, first surface 104 is connected to second surface 106 such that first surface 104 pivots relative to second surface 106 such that second surface 106 can be selectively positioned relative to first surface 104. For example, first surface 104 may be connected to second surface 106 by a hinge. Second surfaces 106 each extend outwardly or away from first surfaces 104 such that when second surfaces 106 engage a wall or frame of vehicle 200, ends 26 of the first pair of side members 22 are spaced apart from the wall or frame of the vehicle. This configuration allows room for components of system 10 between the wall or frame of the vehicle and first shelving unit 20. For example, the configuration described above allows room for ladder cage 420 and other components a serviceman might require, such as, for example, a second ladder L2, as shown in FIG. 1. The configuration described above allows first shelving unit 20 to be mounted adjacent a wheel well W of vehicle 200 shown in FIG. 1, since the first pair of side members 22 are spaced apart from the wall or frame of the vehicle.

In embodiments in which first shelving unit 20 is configured for mounting in a vehicle such that first shelving unit 20 is accessible through rear doors of the vehicle, second surface 106 includes one or more openings configured for disposal of a fastener such that the fastener extends through the opening in second surface 106 and into a side wall or frame of the vehicle to fix first shelving unit 20 relative to the vehicle. It is envisioned that the one or more openings extending through second surface 106 may indude threads to facilitate engagement with a fastener. In some embodiments, upper member 100 may be configured to engage the ceiling of a vehicle using bracket 102 described above. In some embodiments, upper member 100 is configured to engage the ceiling of a vehicle and does not include a bracket. Rather, upper member 100 is a single plate that includes one or more openings extending parallel to axis A2 configured for disposal of a fastener such that the fastener extends through the opening in upper member 100 and into the ceiling of the vehicle to fix first shelving unit 20 relative to the vehicle. In some embodiments, upper member 100 includes surface configurations to enhance fixation with the interior of the vehicle, such as, for example, rough, arcuate, undulating, porous, semi-porous, dimpled, polished and/or textured according to the requirements of a particular application.

A first lower member 108 extends between and connects second ends 26 of the first pair of first members 22 and a second lower member 108 extends between and connects ends 26 of the second pair of first members 22. Lower members 108 each include a first surface including an aperture 110 extending parallel to axis A2 configured for disposal of a fastener such that the fastener extends through aperture 110 and into the floor of the vehicle to fix first shelving unit 20 relative to the vehicle. In some embodiments, aperture 110 is threaded. It is envisioned that lower members 108 may each include one or a plurality of apertures 110. In some embodiments, apertures 110 are uniformly spaced apart from one another. In some embodiments, lower members 108 extend outwardly or away from the respective pairs of side members 22 a distance that is equal to the distance in which second surfaces 106 of brackets 102 extend outwardly or away from the respective pairs of side members 22 such that when lower members 108 engage a wall or frame of vehicle 200, ends 26 of each of the first and second pairs of side members 22 are spaced apart from the wall or frame of the vehicle.

In some embodiments, rails 96 each include a first locking element 110 positioned adjacent first wall 90 and a second locking element 112 positioned adjacent second wall 92. Second locking element 112 is connected to first locking element 110 by a cable 114. An inner surface 84 of each guide member 74 includes at least one flange 116 configured to engage second locking element 112 to fix container 88 relative to cross member 68 and/or guide member 74. In some embodiments, first shelving unit 20 includes a first flange 116 adjacent first wall 90 and a second flange 116 spaced apart from the first flange 116 adjacent second wall 92. In some embodiments, flange 116 extends at an acute angle relative to an axis defined by guide member 74.

First locking element 110 includes a first knob 118 and second locking element 112 includes a second knob 120. Cable 114 engages first knob 118 and second knob 120 to connect first locking element 110 with second locking element 112. In some embodiments, cable 114 comprises a rigid material such that the distance between first knob 118 and second knob 120 is fixed. In some embodiments, a first end of cable 114 defines a hook that engages first knob 118 and a second end of cable 114 defines a hook that engages second knob 120, the hooks being oriented in opposite directions. That is, the hook that engages first knob 118 has an opening oriented in a direction that is opposite the direction in which the opening of the hook that engages second knob 120 is oriented. In some embodiments, cable 114 applies tension between first knob 118 and second knob 120. A first end 122 of first locking element 110 pivots relative to a second end 124 of first locking element 110 about a pivot point 126 positioned between first knob 118 and first wall 90. A first end 128 of second locking element 112 pivots relative to a second end 130 of second locking element 112 about a pivot point 132 positioned between second knob 120 and first wall 90.

Figure 15:
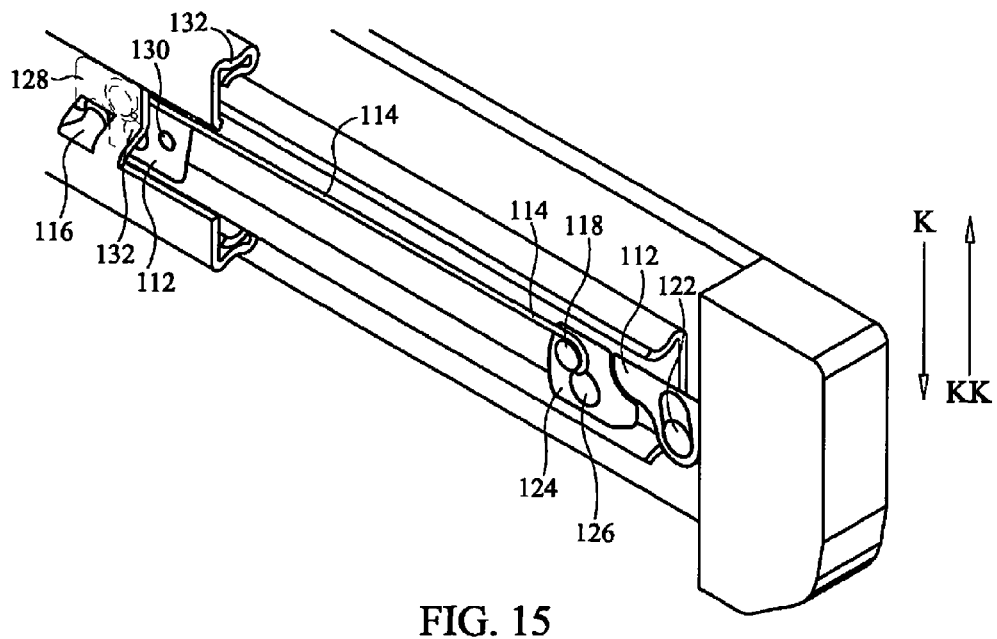
FIG. 15 is a perspective view of components of the system shown in FIG. 1, with components of the system in a first position.
Figure 16:
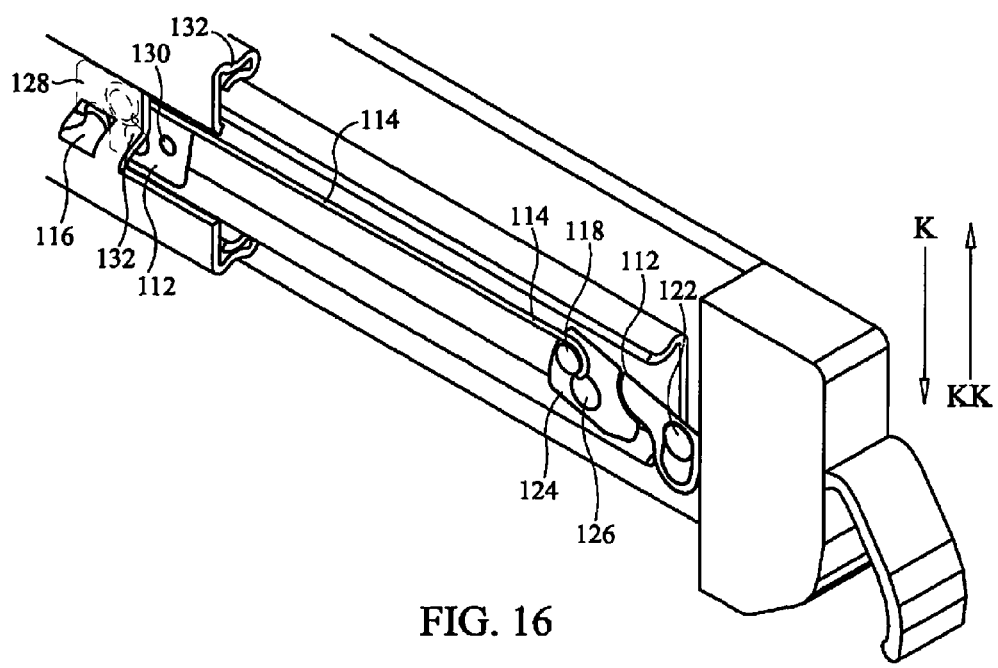
FIG. 16 is a perspective view of components of the system shown in FIG. 1, with components of the system in a second position.

First wall 90 includes a handle 134 including a third locking element 136 that engages first end 122 of first locking element 110. First wall 90 has a length extending between side walls 94, 94. Handle 134 extends between side walls 94, 94 such that handle 134 has a length that is equal to the length of first wall 90. Handle 134 is movable between a first position in which first end 128 of second locking element 112 engages flange 116 of guide member 74 and container 88 is fixed relative to guide member 74, as shown in FIG. 15, and a second position in which first end 128 of second locking element 112 is spaced apart from flange 116 and container 88 can translate relative to guide member 74, as shown in FIG. 16. This configuration allows containers 88 to be fixed in a closed position in which containers 88 are positioned between side members 22 by manipulating handles 134 to the first position. Containers 88 may be moved from the closed position to an open position by manipulating handles 134 to the second position, which allows containers 88 to move relative to side members 22, such that containers 88 can extend at least partially through at least one rear door of vehicle 200 to allow a serviceman to access items within containers 88, for example. Releasing handle 134 or otherwise manipulating handle 134 so that handle 134 returns to the first position will fix containers 88 relative to side members 22. As such, the amount containers 88 extend through at least one rear door of vehicle 200 can be selectively adjusted.

Handle 134 includes a first portion 138 and a second portion 140 that movably engages first portion 138. Second portion 140 includes third locking element 136. Third locking element 136 includes a pin that extends perpendicular to axis A2. Moving second portion 140 from a first orientation, shown in FIG. 15, to a second orientation, shown in FIG. 16, moves handle 134 from the first position to the second position. In some embodiments, handle 134 is biased to the first position by a spring 142 that engages third locking element 136. Moving second portion 140 of handle 134 from the first orientation to the second orientation moves third locking element 136 in a downward direction, such as, for example, the direction shown by arrow K, such that second end 124 of first locking element 110 moves in an opposite, upward direction such as, for example, the direction shown by arrow KK. First end 128 of second locking element 112 moves in the upward direction when second end 124 of first locking element 110 moves in the upward direction.

Figure 13:
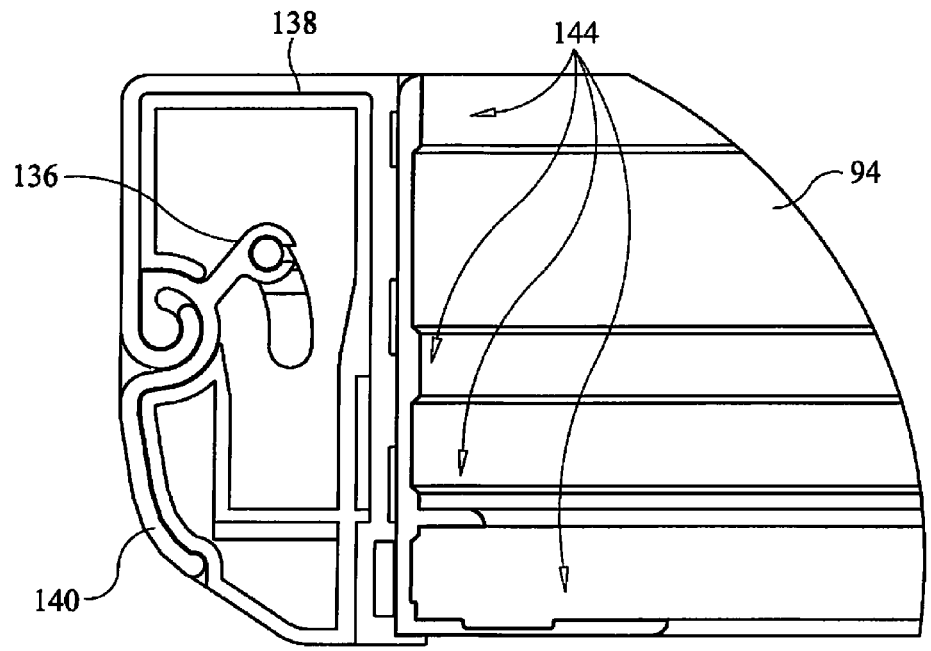
FIG. 13 is a side, cross sectional view of components of the system shown in FIG. 1 along lines D-D in FIG. 9 at Detail E in FIG. 9.
Figure 14:
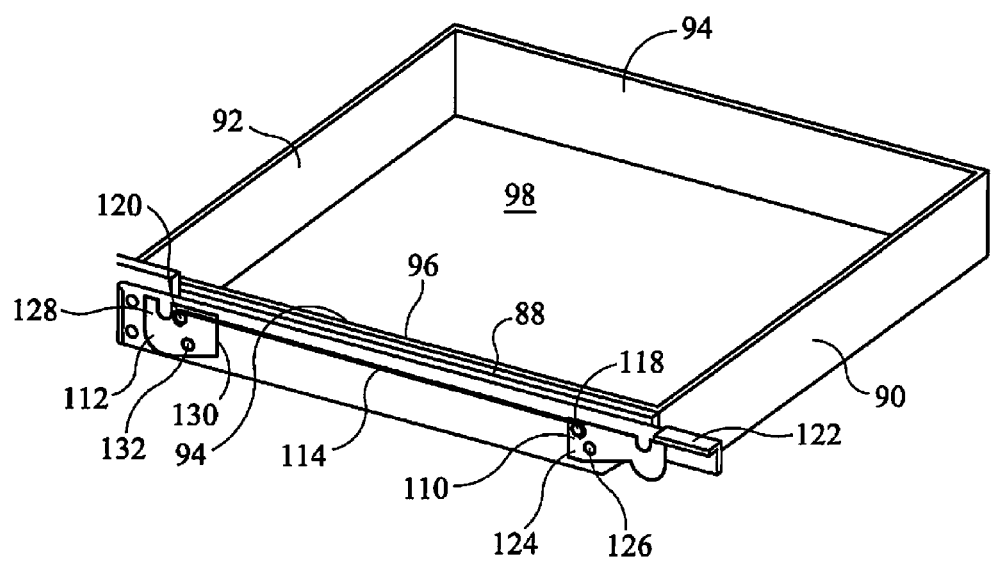
FIG. 14 is a perspective view of components of the system shown in FIG. 1.

Side walls 94, 94 of container 88 each include an inner surface defining a plurality of spaced apart recesses 144 extending parallel to one another and first wall 90 includes a plurality of spaced apart protuberances 146 each extending parallel to one another that are disposed in recesses 144 to engage first wall 90 with side walls 94, 94. As shown in FIG. 13, protuberances 146 may have varying lengths. In some embodiments, the lengths of protuberances 146 increases from the top of first wall 90 to the bottom of first wall 90. In some embodiments, this configuration is reversed. That is, the lengths of protuberances 146 decreases from the top of first wall 90 to the bottom of first wall 90. In some embodiments, the upper most protuberance 146 and the lower most protuberance 146 each have a length that is less than a protuberance 146 positioned between the upper most protuberance 146 and the lower most protuberance 146. In some embodiments, each of the protuberances 146 has a length that is substantially equivalent.

In some embodiments, vehicle 200 is a van, truck or car having at least one first side door 202 and at least one second side door 204 opposite first side door 202. It is envisioned that the at least one first side door 202 may include a pair of first side doors 202 that open independently of one another. It is envisioned that vehicle 200 may lack a post or other support means between the pair of first side doors 202 such that an interior of vehicle 200 has an open configuration adjacent the pair of first side doors 202. It is envisioned that the at least one second side door 204 may include a pair of second side doors 204 that open independently of one another. It is envisioned that vehicle 200 may lack a post or other support means between the pair of second side doors 204 such that the interior of vehicle 200 has an open configuration adjacent the pair of second side doors 204. Vehicle 200 includes a partition 206 positioned between the pair of first side doors 202 and the pair of side doors 204. Partition 206 is fixed relative to vehicle 200 and extends substantially parallel to side doors 202, 204 when side doors 202, 204 are in a closed position. That is, partition 206 extends parallel to an axis defined by vehicle 200. It is envisioned that partition 206 may extend from a floor of vehicle 200 to a ceiling of vehicle 200. In some embodiments, partition 206 is removable. In some embodiments, partition 206 integrally formed with the floor and/or ceiling of the vehicle.

First and second side members 22, 22 are positioned in the interior of vehicle 200 such that first and second side members 22, 22 extend perpendicular to partition 206. One of first and second side members 22, 22 engages a first surface 208 of partition 206. Slides 42, cross members 68, guide members 74, containers 88, upper members 100 and lower members 108 are positioned relative to side members 22 and/or one another in the manner described above to define a first first shelving unit 250, as best shown in FIGS. 21 and 22.

In some embodiments, system 10 includes a second first shelving unit 350 similar to first shelving unit 20. Second shelving unit comprising third and fourth side members 322 each having a configuration similar to side members 22, 22. Third and fourth side members 322, 322 include an inner surface defining a fourth channel. Third and fourth side members 322, 322 are being positioned in the interior of vehicle 200 such that third and fourth side members 322, 322 extend perpendicular to partition 206. One of third and fourth side members 322, 322 engage a second surface 210 of partition 206 that is opposite first surface 208. A second slide 42 is movably disposed in each fourth channel of third and fourth side members 322, 322. The fourth channels each have a configuration similar to first channels 30. A second cross member 68 extends between and connects the second slides 42. A second guide 74 is movably disposed in second channel 72 of second cross member 68. A rail 96 of a second container 88 is movably disposed in third channel 86 of second cross member 68.

Figure 22:
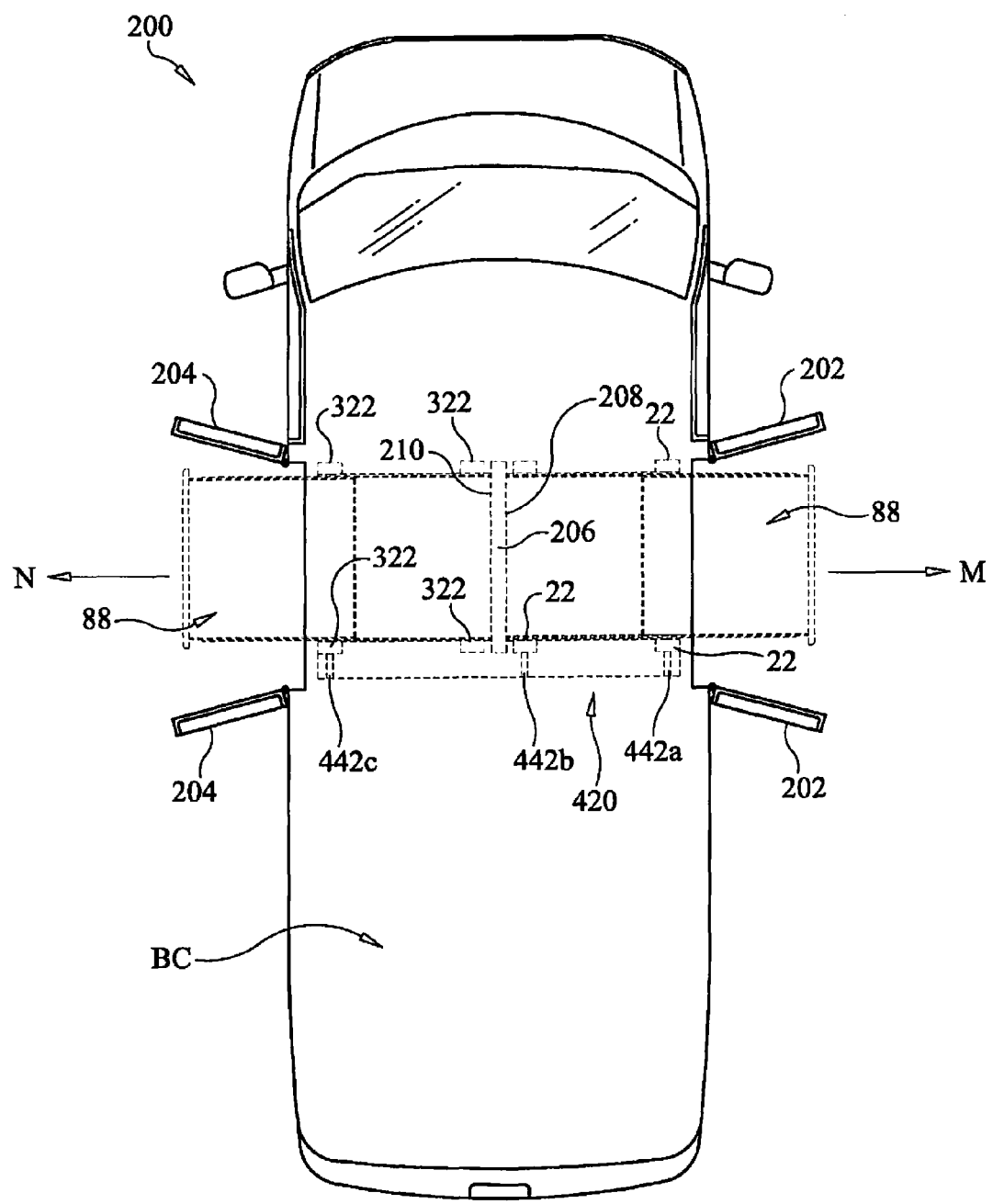
FIG. 22 is a top, cross sectional view of components of the system shown in FIG. 1.

Container 88 of first first shelving unit 250 and second container 88 of second first shelving unit 350 open in opposing directions, as best shown in FIG. 22. That is, container 88 opens by moving container 88 relative to vehicle 200 in the direction shown by arrow M and closes by moving container 88 relative to vehicle 200 in the direction shown by arrow N. Conversely, container 388 opens by moving container 388 relative to vehicle 200 in the direction shown by arrow N and closes by moving container 388 relative to vehicle 200 in the direction shown by arrow M.

Figure 21:
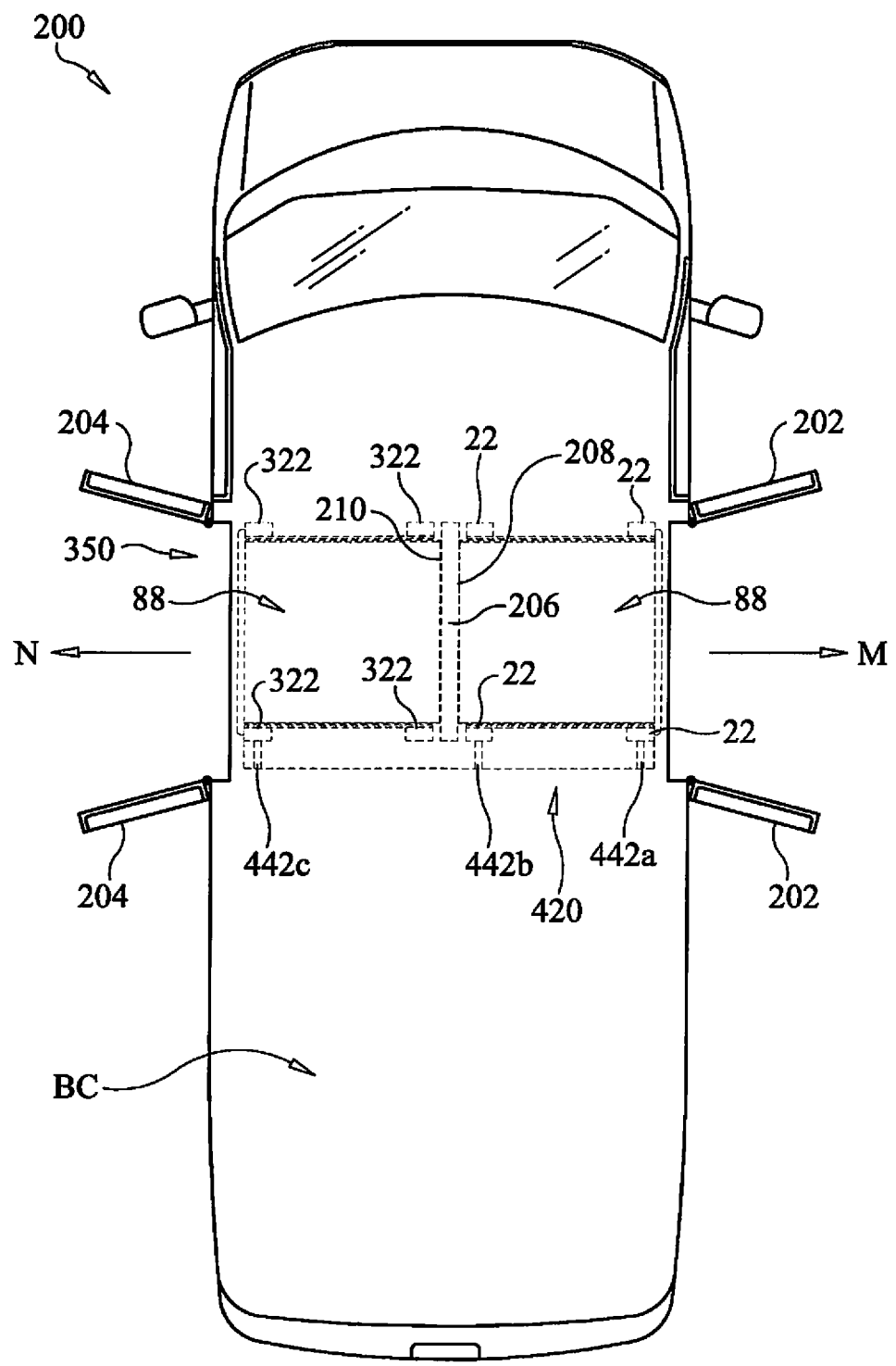
FIG. 21 is a top, cross sectional view of components of the system shown in FIG. 1.

In some embodiments, ladder cage 420 is mounted to first first shelving unit 25 and second first shelving unit 35, as shown in FIGS. 21 and 22. Space BC in the rear portion of vehicle 200 to be used to store bulk cargo. Bracket 442a is coupled to one of the first pair of side members 22, bracket 442b is coupled to the other one of the first pair of side members 22 and bracket 442c is coupled to one of side members 322. This configuration allows ladder L to be inserted into ladder cage 420 through doors 202 in the direction shown by arrow N and allows ladder L to be removed from ladder cage 420 through doors 202 in the direction shown by arrow M. In some embodiments, bracket 442a is coupled to one of the side members 322 that faces the front of vehicle 200, bracket 442b is coupled to the other one of the side members 322 that faces the front of vehicle 200 and bracket 442c is coupled to one of the second pair of side members 22. This configuration allows ladder L to be inserted into ladder cage 420 through doors 204 in the direction shown by arrow M and allows ladder L to be removed from ladder cage 420 through doors 204 in the direction shown by arrow N. In some embodiments, at least one additional ladder cage, similar to ladder cage 420 is mounted within space BC, such as, for example, to the frame or sidewalls of vehicle 200.

In some embodiments, second shelving unit 220 is configured to be mounted in a vehicle, such as, for example, vehicle 200 such that second shelving unit 220 is accessible through one or more side doors of vehicle 200, as shown in FIG. 20, for example. That is, second shelving unit 220 may be configured such that drawers or containers of second shelving unit 220 may be positioned outside of vehicle 200 by moving such drawers or containers through an opening defined by one or more side doors of vehicle 200, when the one or more side doors is/are in an open position.

Figure 23:
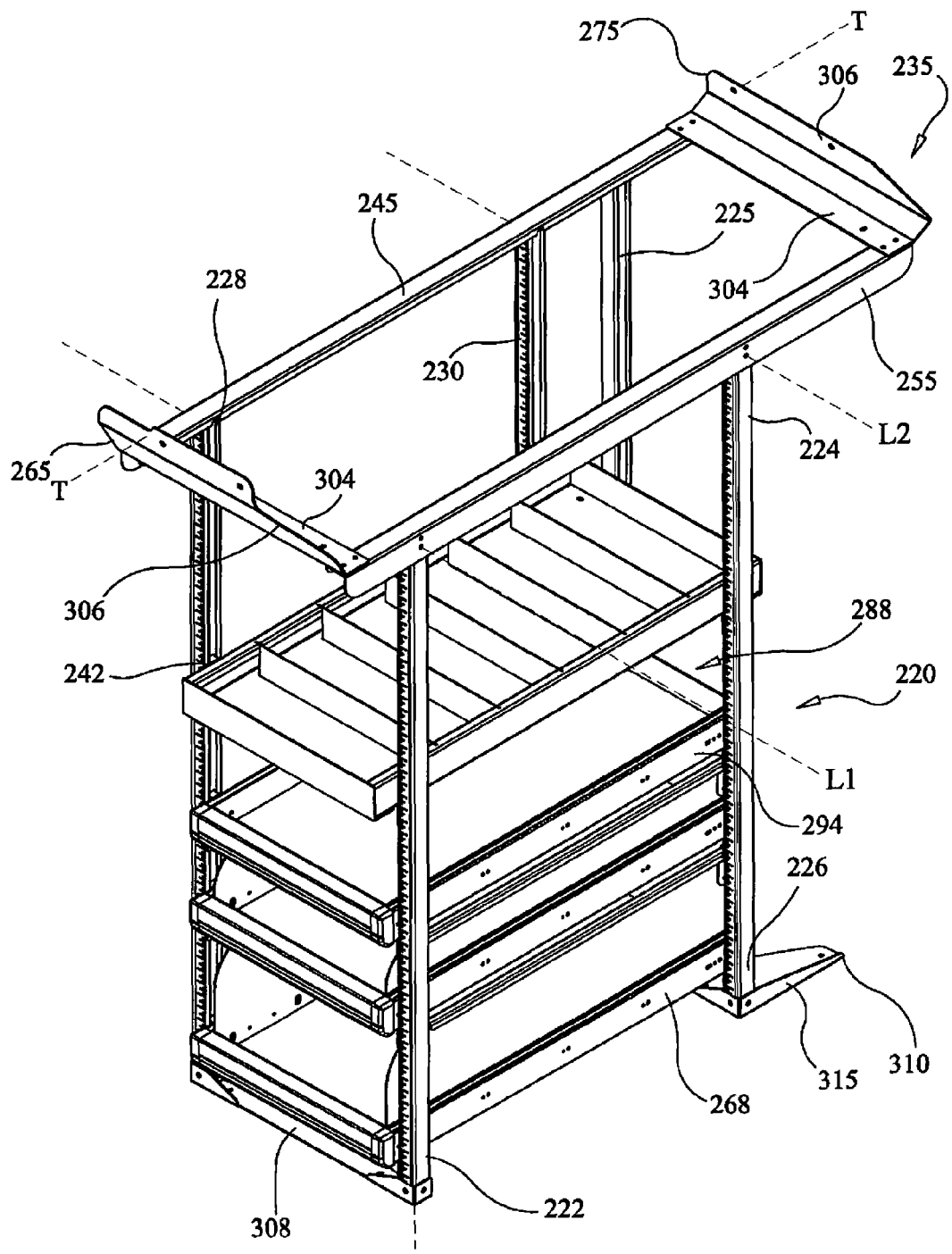
FIG. 23 is a perspective view of components of the system shown in FIG. 1.

Second shelving unit 220 is similar to first shelving unit 20 and includes a first pair of side members 222 opposite a second pair of side members 222. Vertical member 225 extends parallel to each of side members 222 and is aligned with the first pair of side members 222 along a transverse axis T, as shown in FIG. 23. Side members 222 each extend along a longitudinal axis A3 between a first end 224 and a second end 226. Side members 222 have a length defined by the distance between ends 224, 226. Side members 222 each have the same maximum length and vertical member 225 has a maximum length that is equal to that of side members 222 to allow an upper mounting bracket of second shelving unit 220 to lie flat in a horizontal plane, as discussed herein. Side members 222 each include an inner surface 228 defining a first channel 230. First channels 230 each extend the entire length of each side member 222. Inner surfaces 228 of the first pair of side members 222 face inner surfaces of the second pair of side members 222.

At least one slide 242 is movably disposed in each first channel 230. It is envisioned that second shelving unit 220 may include one or a plurality of slides 242 disposed in each first channel 230. In the embodiment shown in FIG. 23, each first channel 230 includes four slides 242 movably disposed therein. It is envisioned that each of side members 222 includes the same number of slides 242 positioned therein. That is, each side member 222 that makes up the first pair of side members 222 includes the same number of slides as each side member 222 that makes up the second pair of side members 222. It is envisioned that the number of slides 242 in each first channel 230 is equal to the number of drawers or containers included in second shelving unit 220.

Two slides 242 are connected to one another by a cross member 268 similar to cross member 68. That is, one cross member 268 extends between and connects each of the slides 242 positioned in first channels 230 of the first pair of side members 222 and one cross member 268 extends between and connects each of the slides 242 positioned in first channels 230 of the second pair of side members 222. In some embodiments, a plurality of cross members 268 extend between and connect slides 242 positioned in first channels 230 of the first pair of side members and an equal number of cross members 268 extend between and connect slides 242 positioned in first channels 230 of the second pair of side members such that the cross members 268 connecting the first pair of side members 222 are parallel aligned with the cross members 268 connecting the second pair of side members 222.

Cross members 268 each include an inner surface defining a second channel configured for movable disposal of a guide member (not shown) similar to guide member 74. Cross members 268 each include spaced apart threaded openings that are each aligned with a threaded aperture in one of the slides 242. A threaded fastener (not shown) similar to threaded fastener 82 extends through a respective opening in cross member 268 and a respective aperture in slide 242 to fix cross member 268 with slides 242. The fasteners are moveable between a first position in which an outer surface of cross member 268 is spaced apart from outer surfaces of side members 222 and the slides 242 can translate axially within first channels 230 and a second position in which the outer surface of cross member 268 engages the outer surfaces of side members 222 and the slides 242 are fixed relative to side members. That is, when the fasteners re in the first position, slides 242 can translate within first channels 230 to adjust the position of slides 242 relative to side members 222. The fasteners are then moved from the first position to the second position to fix the position of slides 242 relative to side members 222.

In some embodiments, side members 222 each include indicia on an outer surface thereof, such as, for example, calibrated lines to measure distances. Such indicia may be used to ensure that four slides 242, each disposed in a first channel 230 of one of the side members 222 that make up the first and second pairs of side members 222 may each be aligned to define a first level. It is envisioned that the indicia may also be used to align other levels of slides 242 before or after aligning the first level.

A container 288 includes a pair of spaced apart side walls 294. Outer surfaces of each side wall 294 includes a rail (not shown) similar to rail 96. One rail of one container 288 is movably disposed in a third channel of a guide member that extends between the first pair of side members 222 and one rail of the container 288 is movably disposed in a third channel of an aligned guide member that extends between the second pair of side members 222. Container 288 includes a recessed tray 298 positioned between side walls 294. Tray 298 is maintained in a substantially horizontal orientation relative to axis A3 when container 288 translates within the third channel and the guide member translates within the second channel. Second shelving unit 220 may include one or a plurality of containers 288. It is envisioned that the number of containers 288 included corresponds to the number of slides 242 and/or the number of cross members 268 or guide members. That is, second shelving unit 220 includes one container 288 for every four slides 242 and one container 288 for every two cross members 268 or every two guide members.

Second shelving unit 220 is configured to be accessible through side doors 202 of vehicle. However, it is also envisioned that second shelving unit 220 may be configured to be accessible through side doors 204 of vehicle. Second shelving unit 220 indudes an upper mounting bracket 235 having a rectangular configuration. It should be noted that the first pair of side members 222 are positioned opposite the second pair of side members 222. That is one of the first pair of side members 222 is aligned with one of the second pair of side members 22 along a lateral axis L1 and the other one of the first pair of side member 22 is aligned with the other one of the pair of side members along a lateral axis L2, as shown in FIG. 23. Lateral axis L2 extends parallel to lateral axis L1 and lateral axes L1, L2 extend perpendicular to longitudinal axis A3. However, second shelving unit 220 does not include any component opposite vertical member 225. That is, vertical member is not aligned with any other component of second shelving unit 220 along an axis that extends parallel to lateral axes L1, L2 such that the corner of upper mounting bracket 235 defined by a second horizontal member 255 of upper mounting bracket 235 and a second lateral member 275 of upper mounting bracket 235 is unsupported by any vertical component of second shelving unit 220.

Upper mounting bracket 235 is configured to mount second shelving unit 220 to the frame or side walls or panels of a vehicle, such as, for example, vehicle 200. Upper mounting bracket 235 includes a first horizontal member 245 that extends continuously between the first pair of side members 222 and vertical member 225 to connect the first pair of side members 222 and vertical member 225. Second horizontal member 255 that extends continuously between the second pair of side members 222 to connect the second pair of side members 222. First horizontal member extends parallel to second horizontal member 255. First horizontal member 245 has a maximum length that is equal to that of second horizontal member 255 such that a first end surface of first horizontal member 245 is aligned with a first end surface of second horizontal member 255 along an axis that extends perpendicular to transverse axis T and a second end surface of first horizontal member 245 is aligned with a second end surface of second horizontal member 255 along an axis that extends perpendicular to transverse axis T.

A first lateral member 265 connects first ends of first horizontal member 245 and second horizontal member 255 and second lateral member 275 connects second ends of first horizontal member 245 and second horizontal member 255. First lateral member 265 and second lateral member 275 each include a first surface 304 extending perpendicular to axis A3 and a second surface 306 disposed at an acute angle relative to first surface 304. In some embodiments, first surface 304 is connected to second surface 306 such that first surface 304 pivots relative to second surface 306 such that second surface 306 can be selectively positioned relative to first surface 304.

In embodiments in which second shelving unit 220 is configured for mounting in a vehicle such that second shelving unit 220 is accessible through side doors of the vehicle, second surfaces 306 of first lateral member 265 and second lateral member 275 may each include one or more openings configured for disposal of a fastener such that the fastener extends through the opening in the second surface 306 and into a side wall or frame of the vehicle to fix second shelving unit 220 relative to the vehicle. It is envisioned that the one or more openings extending through second surface 306 may include threads to facilitate engagement with a fastener. In some embodiments, second surfaces 306 of first lateral member 265 and second lateral member 275 may each be configured to engage the ceiling of a vehicle. In some embodiments, second surface 306 of one of first lateral member 265 and second lateral member 275 may be configured to engage the ceiling of a vehicle and second surface 306 of the other one of first lateral member 265 and second lateral member 275 may be configured to engage the a side wall or frame of the vehicle. Second lateral member 275 extends outwardly or away from vertical member 225 such that when second surface 306 of second lateral member 275 engages a wall or frame of vehicle 200, vertical member 225 is spaced apart from the wall or frame of the vehicle. This configuration allows room for components of system 10 between the wall or frame of the vehicle and second shelving unit 220. For example, the configuration described above allows room for ladder cage 420 and other components a serviceman might require, such as, for example, a second ladder L2, as shown in FIG. 1.

In situations where second shelving unit 220 is accessible through side doors 202 of vehicle, second shelving unit 220 may be recessed inwardly from side doors 202 of vehicle 200. Second surface 306 of second lateral member 275 may be configured to engage the ceiling of a vehicle and second surface 306 of first lateral member 265 may be configured to engage the a side wall or frame of the vehicle, as shown in FIG. 20. Likewise, in situations where second shelving unit 220 is accessible through side doors 204 of vehicle, second shelving unit may be recessed inwardly from side doors 204 of vehicle 200. Second surface 306 of first lateral member 265 may be configured to engage the ceiling of a vehicle and second surface 306 of second lateral member 275 may be configured to engage the a side wall or frame of the vehicle.

A first lower member 308 extends between and connects second ends 226 of one of the first pair of first members 222 and one of the second pair of first members 222. A second lower member 315 extends between and connects second ends 226 of the other one of the first pair of first members 222 and the other one of the second pair of first members 222. Lower members 308, 315 each include a first surface including an aperture 310 extending parallel to axis A3 configured for disposal of a fastener such that the fastener extends through aperture 310 and into the floor of the vehicle to fix second shelving unit 220 relative to the vehicle. In some embodiments, aperture 310 is threaded. It is envisioned that lower members 308, 315 may each include one or a plurality of apertures 310. In some embodiments, apertures 310 are uniformly spaced apart from one another.

In some embodiments, the rails on side walls 294 of containers 288 each include a first locking element similar to first locking elements 110 and a second locking element similar to second locking elements 112. Front walls of containers 288 include a handle similar to handle 134. The handles each have a third locking element similar to third locking element 136. Second shelving unit 220 includes components that cooperate with the first, second and third locking elements of second shelving unit 220 that are similar to the components of first shelving unit 20 that cooperate with first, second and third locking elements 110, 112, 136 to allow the handles of containers 288 to be movable between a first position in which a first end of the second locking element engages a flange of the guide member and container 288 is fixed relative to the guide member and a second position in which the first end of the second locking element is spaced apart from the flange and container 288 can translate relative to the guide member. This configuration allows containers 288 to be fixed in a closed position in which containers 288 are positioned between side members 222 by manipulating the handles of second shelving unit 220 to the first position. Containers 288 may be moved from the closed position to an open position by manipulating the handles to the second position, which allows containers 288 to move relative to side members 222, such that containers 288 can extend at least partially through one or more side doors of vehicle 200 to allow a serviceman to access items within containers 288, for example. Releasing the handle or otherwise manipulating the handle so that the handle returns to the first position will fix containers 288 relative to side members 222. As such, the amount containers 288 extend through at least one side door of vehicle 200 can be selectively adjusted.

In some embodiments, first shelving unit 20 includes a first mounting bracket 325 configured to mount a first end 622 of carrier 620 to first shelving unit 20 and second horizontal member 255 of second shelving unit 220 includes a mounting plate 335 configured to mount a second end 624 of carrier 620 to second shelving unit 220, as shown in FIG. 1. First mounting bracket 325 includes first and second arms 325a, 325b that extend through the apertures 390 in one of side members 22. First and second arms 325a, 325b are each linear and extend parallel to one another. First and second arms 325a, 325b are connected to one another by a concave portion 325c such that second mounting bracket 325 has a C-shaped configuration when assembled with first shelving unit 20. Mounting plate 335 includes a first portion 345 that extends parallel to longitudinal axis A3 and a second portion 355 that extends perpendicular to longitudinal axis A3. Second portion 355 includes a pair of apertures that extend parallel to longitudinal axis A3. First and second arms 365a, 365b of a second mounting bracket 365 extend through the apertures in second portion 355. First and second arms 365a, 365b are each linear and extend parallel to one another. First and second arms 365a, 365b are connected to one another by a concave portion 365c such that second mounting bracket 365 has a U-shaped configuration when assembled with second shelving unit 220. First and second arms 365a, 365b may be threaded for engagement with threaded nuts to fix second mounting bracket 365 to mounting plate 335.

Carrier 620 is positioned through first and second mounting brackets 325, 365 to couple carrier 620 to first and second shelving units 20, 220. The configuration of first and second mounting brackets 325, 365 discussed above positions first end 622 of carrier 620 between bracket 102 of first shelving unit 20 and ladder cage 420 and positions second end 624 of carrier between first lateral member 265 of second shelving unit 220 and ladder cage 420 such that carrier 620 is spaced apart from ladder cage 420. However, it is envisioned that the components of system 10 may be variously configured. In some embodiments, carrier 620 is positioned such that carrier 620 engages ladder cage 420 to further secure carrier 620 relative to other components of system 10. In some embodiments, vertical member 225 of second shelving unit 220 is positioned on an opposite side of second shelving unit 220, such as, for example, adjacent first lateral member 265 of second shelving unit 220 and ladder cage 420 engages the second pair of side members 22 such that ladder cage 420 may be positioned on opposite sides of first and second shelving units 20, 220. In some embodiments, carrier 620 may be mounted to an exterior of a vehicle, such as, for example, a roof of vehicle 200. In some embodiments, system 10 includes at least one additional carrier, such as, for example, carrier 620 that may be mounted within the interior of vehicle 200, such as, for example, to a frame or sidewall of vehicle 200, or to an exterior of a vehide, such as, for example, a roof of vehicle 200.

Carrier 620 is tubular or cylindrical and includes an inner surface defining a conduit. First end 622 of carrier 620 has an opening that is in communication with the conduit. In some embodiments, second end 624 of carrier 620 is permanently dosed such that the only access to the conduit is through the opening in first end 622 of carrier 620. In some embodiments, first end 622 includes a hinged lid 626 configured to removably cover the opening in first end 622. In some embodiments, carrier 620 comprises polyvinyl chloride (PVC).

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A ladder cage comprising:
opposite first and second sidewalls each extending parallel to a longitudinal axis;
a roller having a first end that extends through the first sidewall and a second end that extends through the second sidewall, the roller being rotatable relative to the sidewalls along a rotation axis that extends transverse to the longitudinal axis;
spaced apart brackets that are each coupled to one of the sidewalls; and
an end stop coupled to the sidewalls, the end stop comprising first and second side panels that extend parallel to the longitudinal axis and an end panel that extends between and connects the first side panel and the second side panel,
wherein inner surfaces of the sidewalls and the panels define a housing configured for disposal of a ladder.

2. A ladder cage as recited in claim 1, wherein the first side panel is continuous with the first sidewall and the second side panel is continuous with the second sidewall.

3. A ladder cage as recited in claim 1, further comprising a bottom wall extending between and connecting the first and second sidewalls, wherein the end stop comprises a bottom panel that extends between the first and second side panels, the bottom panel being continuous with the bottom wall.

4. A ladder cage as recited in claim 3, wherein there are no gaps between the bottom wall and the bottom panel, no gaps between the first side panel and the first sidewall and no gaps between the second side panel and the second sidewall.

5. A ladder cage as recited in claim 1, wherein the end stop has a maximum height that is greater that of the sidewalls.

6. A ladder cage as recited in claim 1, wherein the panels each have a height in a direction that is transverse to the longitudinal axis that is greater than that of the sidewalls.

7. A ladder cage as recited in claim 1, wherein:
the first side panel extends from a first end that is coupled to the first sidewall to a second end that is coupled to the end panel, the first side panel being tapered from the second end to the first end; and
the second side panel extends from a first end that is coupled to the second sidewall to a second end that is coupled to the end panel, the second side panel being tapered from the second end of the second side panel to the first end of the second side panel.

8. A ladder cage as recited in claim 1, wherein the end stop is coupled to proximal ends of the sidewalls and the roller extends between the sidewalls at opposite distal ends of the sidewalls.

9. A ladder cage as recited in claim 1, wherein the roller is a first roller and the ladder cage further comprises spaced apart second and third rollers each having a first end that extends through the first sidewall and a second end that extends through the second sidewall, the second and third rollers each being rotatable relative to the sidewalls along a rotation axis that extends transverse to the longitudinal axis, the second and third rollers being positioned between the first roller and the end stop.

10. A ladder cage as recited in claim 9, wherein the second and third rollers each have a maximum diameter that is less than that of the first roller.

11. A ladder cage as recited in claim 1, further comprising the ladder, the ladder being positioned within the housing.

12. A ladder cage as recited in claim 1, wherein the brackets each include a portion that extends from the first sidewall to the second sidewall.

13. A ladder cage as recited in claim 1, further comprising a bottom wall extending between and connecting the first and second sidewalls, wherein the sidewalls each extend perpendicular to the bottom surface.

14. A ladder cage as recited in claim 1, further comprising a bottom wall extending from the first sidewall to the second sidewall and a bottom panel extending from the first side panel to the second side panel, the bottom panel being continuous with the bottom surface, the end panel comprising a first end that engages the bottom panel.

15. A ladder cage as recited in claim 1, wherein the rotation axis extends perpendicular to the longitudinal axis.

16. A ladder cage comprising:
first and second sidewalls, inner surfaces of the sidewalls facing one another to define a channel therebetween, the channel extending along a channel axis from first ends of the sidewalls to second ends of the sidewalls;
an end stop including first and second side panels that are each coupled to the second end of one of the sidewalls and an end panel that extends from the first side panel to the second side panel such that the channel axis intersects the end panel, inner surfaces of the panels defining a cavity, the channel and the cavity being configured for disposal of a ladder; and
a roller having a first end that extends through the first sidewall and a second end that extends through the second sidewall, the roller being rotatable relative to the sidewalls along a rotation axis that extends transverse to the channel axis.

17. A ladder cage as recited in claim 16, further comprising a bottom wall extending from the first sidewall to the second sidewall and a bottom panel extending from the first side panel to the second side panel, the bottom panel being continuous with the bottom surface, the end panel comprising a first end that engages the bottom panel.

18. A ladder cage comprising:
a ladder;
opposite first and second sidewalls each extending parallel to a longitudinal axis;
spaced apart brackets that are each coupled to one of the sidewalls;
an end stop coupled to the sidewalls, the end stop comprising first and second side panels that extend parallel to the longitudinal axis and an end panel that extends between and connects the first side panel and the second side panel; and
a roller having a first end that extends through the first sidewall and a second end that extends through the second sidewall, the roller being rotatable relative to the sidewalls along a rotation axis that extends transverse to the longitudinal axis,
wherein inner surfaces of the sidewalls and the panels define a housing having the ladder positioned therein.

19. A ladder cage as recited in claim 18, further comprising a bottom wall extending from the first sidewall to the second sidewall and a bottom panel extending from the first side panel to the second side panel, the bottom panel being continuous with the bottom surface, the end panel comprising a first end that engages the bottom panel.

* * * * *